United States Patent
Houh et al.

(10) Patent No.: US 9,934,223 B2
(45) Date of Patent: Apr. 3, 2018

(54) METHODS AND APPARATUS FOR MERGING MEDIA CONTENT

(71) Applicant: CXENSE ASA, Oslo (NO)

(72) Inventors: Henry Houh, Lexington, MA (US); Jeffrey Nathan Stern, Belmont, MA (US)

(73) Assignee: CXENSE ASA, Oslo (NO)

(*) Notice: Subject to any disclaimer, the term of this patent is extended or adjusted under 35 U.S.C. 154(b) by 0 days.

(21) Appl. No.: 14/845,749

(22) Filed: Sep. 4, 2015

(65) Prior Publication Data

US 2015/0378998 A1 Dec. 31, 2015

Related U.S. Application Data

(63) Continuation of application No. 11/446,543, filed on Jun. 2, 2006, now abandoned, which is a continuation-in-part of application No. 11/395,732, filed on Mar. 31, 2006, now abandoned.

(60) Provisional application No. 60/736,124, filed on Nov. 9, 2005.

(51) Int. Cl.
| | |
|---|---|
| G06F 17/30 | (2006.01) |
| H04N 21/435 | (2011.01) |
| H04N 21/44 | (2011.01) |
| H04N 21/482 | (2011.01) |
| H04N 21/8549 | (2011.01) |

(52) U.S. Cl.
CPC .... *G06F 17/30023* (2013.01); *G06F 17/3002* (2013.01); *G06F 17/3084* (2013.01); *G06F 17/30746* (2013.01); *G06F 17/30749* (2013.01); *G06F 17/30772* (2013.01); *G06F 17/30796* (2013.01); *G06F 17/30864* (2013.01); *H04N 21/435* (2013.01); *H04N 21/44016* (2013.01); *H04N 21/4828* (2013.01); *H04N 21/8549* (2013.01)

(58) Field of Classification Search
CPC .................................................. G06F 17/3002
USPC ........................................................ 707/692
See application file for complete search history.

(56) References Cited

U.S. PATENT DOCUMENTS

| | | | |
|---|---|---|---|
| 6,112,172 A * | 8/2000 | True ................. | G06F 17/30017 704/235 |
| 2005/0216443 A1* | 9/2005 | Morton ............... | G06F 17/3002 707/3 |
| 2006/0206526 A1* | 9/2006 | Sitomer .............. | G11B 27/034 707/107 |

* cited by examiner

*Primary Examiner* — Chelcie Daye
(74) *Attorney, Agent, or Firm* — Tarter Krinsky & Drogin LLP

(57) ABSTRACT

A computerized method and apparatus is disclosed for merging content segments from a number of discrete media content (e.g., audio/video podcasts) in preparation for playback. The method and apparatus obtain metadata corresponding to a plurality of discrete media content. The metadata identifies the content segments and their corresponding timing information, such that the metadata of at least one of the plurality of discrete media content is derived using one or more media processing techniques. A number of the content segments are selected to be merged for playback using the timing information from the metadata. The merged media content can be implemented as a playlist identifying the content segments to be merged for playback. The merged media content can also be generated by extracting the content segments to be merged for playback from each of the media files/streams and then merging the extracted segments into one or more merged media files/streams.

20 Claims, 19 Drawing Sheets

FIG. 13

| | | | | |
|---|---|---|---|---|
| WS010 | world | start=T10 | end=T11 | duration=... |
| WS011 | baseball | start=T11 | end=T12 | duration=... |
| WS012 | classic | start=T12 | end=T13 | duration=... |
| WS020 | world | start=T20 | end=T21 | duration=... |
| WS021 | baseball | start=T21 | end=T22 | duration=... |
| WS022 | classic | start=T22 | end=T23 | duration=... |
| WS050 | steriods | start=T30 | end=T31 | duration=... |
| WS060 | steriods | start=T50 | end=T51 | duration=... |
| WS070 | steriods | start=T70 | end=T71 | duration=... |
| MS001 | marker1 | start=T00 | end=T25 | duration=... |
| MS002 | marker2 | start=T25 | end=T99 | duration=... |

1610 spans the WS rows; 1620 spans the MS rows. Table 1600.

METHODS AND APPARATUS FOR MERGING MEDIA CONTENT

RELATED APPLICATIONS

This application is a continuation of U.S. patent application Ser. No. 11/446,543, filed on Jun. 2, 2006, which is a continuation-in-part of U.S. patent application Ser. No. 11/395,732, filed on Mar. 31, 2006, which claims the benefit of U.S. Provisional Application No. 60/736,124, filed on Nov. 9, 2005. The entire teachings of the above applications are incorporated herein by reference.

FIELD OF THE INVENTION

Aspects of the invention relate to methods and apparatus for generating and using enhanced metadata in search-driven applications.

BACKGROUND OF THE INVENTION

As the World Wide Web has emerged as a major research tool across all fields of study, the concept of metadata has become a crucial topic. Metadata, which can be broadly defined as "data about data," refers to the searchable definitions used to locate information. This issue is particularly relevant to searches on the Web, where metatags may determine the ease with which a particular Web site is located by searchers. Metadata that are embedded with content is called embedded metadata. A data repository typically stores the metadata detached from the data.

Results obtained from search engine queries are limited to metadata information stored in a data repository, referred to as an index. With respect to media files or streams, the metadata information that describes the audio content or the video content is typically limited to information provided by the content publisher. For example, the metadata information associated with audio/video podcasts generally consists of a URL link to the podcast, title, and a brief summary of its content. If this limited information fails to satisfy a search query, the search engine is not likely to provide the corresponding audio/video podcast as a search result even if the actual content of the audio/video podcast satisfies the query.

SUMMARY OF THE INVENTION

According to one aspect, the invention features an automated method and apparatus for generating metadata enhanced for audio, video or both ("audio/video") search-driven applications. The apparatus includes a media indexer that obtains a media file or stream ("media file/stream"), applies one or more automated media processing techniques to the media file/stream, combines the results of the media processing into metadata enhanced for audio/video search, and stores the enhanced metadata in a searchable index or other data repository. The media file/stream can be an audio/video podcast, for example. By generating or otherwise obtaining such enhanced metadata that identifies content segments and corresponding timing information from the underlying media content, a number of audio/video search-driven applications can be implemented as described herein. The term "media" as referred to herein includes audio, video or both.

According to another aspect of the invention, the invention features a computerized method and apparatus for merging content segments from a number of discrete media content for playback. Previously, if a user wanted to listen to or view a particular topic available in a number of audio/video podcasts, the user had to download each of the podcasts and then listen to or view the entire podcast content until the desired topic was reached. Even if the media player included the ability to fast forward media playback, the user would more than likely not know when the beginning of the desired topic segment began. Thus, even if the podcast or other media file/stream contained the desired content, the user would have to expend unnecessary effort in "fishing" for the desired content in each podcast.

In contrast, embodiments of the invention obtain metadata corresponding to a plurality of discrete media content, such that the metadata identifies content segments and their corresponding timing information derived from the underlying media content using one or more media processing techniques. A set of the content segments are then selected and merged for playback using the timing information from each of the corresponding metadata.

According to one embodiment, the merged media content is implemented as a playlist that identifies the content segments to be merged for playback. The playlist can include timing information for accessing these segments during playback within each of the corresponding media files/streams (e.g., podcasts) and an express or implicit playback order of the segments. The playlist and each of the corresponding media files/streams are provided in their entirety to a client for playback, storage or further processing.

According to another embodiment, the merged media content is generated by extracting the content segments to be merged for playback from each of the media files/streams (e.g., podcasts) and then merging the extracted segments into one or more merged media files/streams. Optionally, a playlist can be provided with the merged media files/streams to enable a user to navigate among the desired segments using a media player. The one or more merged media files/streams and the optional playlist are then provided to the client for playback, storage or further processing.

According to particular embodiments, the computerized method and apparatus can include the steps of, or structure for, obtaining metadata corresponding to a plurality of discrete media content, the corresponding metadata identifying content segments and corresponding timing information, wherein the metadata of at least one of the plurality of discrete media content is derived from the plurality of discrete media content using one or more media processing techniques; selecting a set of content segments for playback from among the content segments identified in the corresponding metadata; and using the timing information from the corresponding metadata to enable playback of the selected set of content segments at a client.

According to one particular embodiment, the computerized method and apparatus can further include the steps of, or structure for, using the timing information from the corresponding metadata to generate a play list that enables playback of the selected set of content segments by identifying the selected set of content segments and corresponding timing information for accessing the selected set of content segments in the plurality of discrete media content. The computerized method and apparatus can further include the steps of, or structure for, downloading the plurality of discrete media content and the play list to a client for playback.

According to another particular embodiment, the computerized method and apparatus can further include the steps of, or structure for, using the timing information from the corresponding metadata to extract the selected set of content segments from the plurality of discrete media content; and merging the extracted segments into one or more discrete media content. The computerized method and apparatus can further include the steps of, or structure for, downloading the one or more discrete media content containing the extracted segments to a client for playback. The computerized method and apparatus can further include the steps of, or structure for, using the timing information from the corresponding metadata to generate a play list that enables playback of the extracted segments by identifying each of the extracted segments and corresponding timing information for accessing the extracted segments in the one or more discrete media content. The play list can enable ordered or arbitrary playback of the extracted segments that are merged into the one or more discrete media content. The computerized method and apparatus can further include the steps of, downloading the one or more discrete media content containing the extracted segments and the play list to a client for playback.

With respect to any of the embodiments, the timing information can include an offset and a duration. The timing information can include a start offset and an end offset. The timing information can include a marker embedded within each of the plurality of discrete media content. The metadata can be separate from the media content. The metadata can be embedded within the media content.

At least one of the plurality of discrete media content can include a video component and one or more of the content segments can include portions of the video component identified using an image processing technique. One or more of the content segments identified in the metadata can include video of individual scenes, watermarks, recognized objects, recognized faces, or overlay text.

At least one of the plurality of discrete media content can include an audio component and one or more of the content segments including portions of the audio component identified using a speech recognition technique. At least one of the plurality of discrete media content can include an audio component and one or more of the content segments including portions of the audio component identified using a natural language processing technique. One or more of the content segments identified in the metadata can include audio corresponding to an individual word, audio corresponding to a phrase, audio corresponding to a sentence, audio corresponding to a paragraph, audio corresponding to a story, audio corresponding to a topic, audio within a range of volume levels, audio of an identified speaker, audio during a speaker turn, audio associated with a speaker emotion, audio of non-speech sounds, audio separated by sound gaps, or audio corresponding to a named entity, for example.

The computerized method and apparatus can further include the steps of, or structure for, using the metadata corresponding to the plurality of discrete media content to generate a display that enables a user to select the set of content segments for playback from the plurality of discrete media content. The computerized method and apparatus can further include the steps of, or structure for, obtaining the metadata corresponding to the plurality of discrete media content in response to a search query; and using the metadata to generate a display of search results that enables a user to select the set of content segments for playback from the plurality of discrete media content.

According to another aspect of the invention, the invention features a computerized method and apparatus for providing a virtual media channel based on media search. According to a particular embodiment, the computerized method features the steps of obtaining a set of rules that define instructions for obtaining media content that comprise the content for a media channel, the set including at least one rule with instructions to include media content resulting from a search; searching for candidate media content according to a search query defined by the at least one rule; and merging one or more of the candidate media content resulting from the search into the content for the media channel.

The candidate media content can include segments of the media content resulting from the search. The set of rules can include at least one rule with instructions to include media content resulting from a search and at least one rule with instructions to add media content from a predetermined location. The media content from the predetermined location can include factual, informational or advertising content. The candidate media content can be associated with a story, topic, scene or channel. The search query of the at least one rule can be predetermined by a content provider of the media channel. The search query of the at least one rule can be configurable by a content provider of the media channel or an end user requesting access to the media channel.

The computerized method can further include the steps of accessing a database for a plurality of metadata documents descriptive of media files or streams, each of the plurality of metadata documents including searchable text of an audio portion of a corresponding media file or stream; and searching for the candidate media content that satisfy the search query defined by the at least one rule within the database.

Each of the plurality of metadata documents can include an index of content segments available for playback within a corresponding media file or stream, including timing information defining boundaries of each of the content segments. The computerized method can further include the steps of merging one or more of the content segments of the candidate media content from a set of media files or streams using the timing information from metadata documents corresponding to the set of media files or streams. At least one of the plurality of metadata documents can include an index of content segments derived using one or more media processing techniques. The one or more media processing techniques can include at least one automated media processing technique. The one or more media processing techniques can include at least one manual media processing technique.

The computerized method can further include the step of merging one or more of the candidate media content resulting from the search according to a specific or relative number allocated by the at least one rule. The computerized method can further include the step of merging one or more of the candidate media content resulting from the search according to a maximum duration of content for the media channel. The computerized method can further include the step of merging the content for the media channel into one or more media files or stream for delivery. The computerized method can further include the step of merging the content for the media channel into a playlist for delivery.

The computerized method can further include the steps of receiving an indication of a selected media channels from among a plurality of available media channels; and obtaining the set of rules that define instructions for obtaining media content that comprise the selected media channel, the set of rules for the selected media channel being different from the set of rules for other available media channels. The computerized method can further include the step of filtering and sorting the order of candidate media content for inclusion into the content for the media channel.

According to another embodiment, an apparatus for providing content for a media channel is featured. The apparatus includes a channel selector that obtains a set of rules that define instructions for obtaining media content that comprise the content for a media channel, the set including at least one rule with instructions to include media content resulting from a search; a search engine capable of searching for candidate media content according to a search query defined by the at least one rule; and a media merge module that merges one or more of the candidate media content resulting from the search into the content for the media channel.

The candidate media content can include segments of the media content resulting from the search. The apparatus can further include a segment cropper capable of identifying timing boundaries of the segments of media content resulting from the search. The candidate segments can be associated with a story, topic, scene, or channel. The search query of the at least one rule is predetermined by a content provider of the media channel. The channel selector can enable a content provider of the media channel or an end user requesting access to the media channel to configure the search query of the at least one rule.

The apparatus can further include a database storing a plurality of metadata documents descriptive of media files or streams, each of the plurality of metadata documents including searchable text of an audio portion of a corresponding media file or stream; and the search engine searching for the candidate media content that satisfy the search query defined by the at least one rule within the database.

Each of the plurality of metadata documents can include an index of content segments available for playback within a corresponding media file or stream, including timing information defining boundaries of each of the content segments. The media merge module can be capable of merging one or more of the content segments of the candidate media content from a set of media files or streams using the timing information from metadata documents corresponding to the set of media files or streams. At least one of the plurality of metadata documents can include an index of content segments derived using one or more media processing techniques. The apparatus can further include an engine capable of filtering and sorting the order of candidate inclusion into the content for the media channel.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Figure 12:
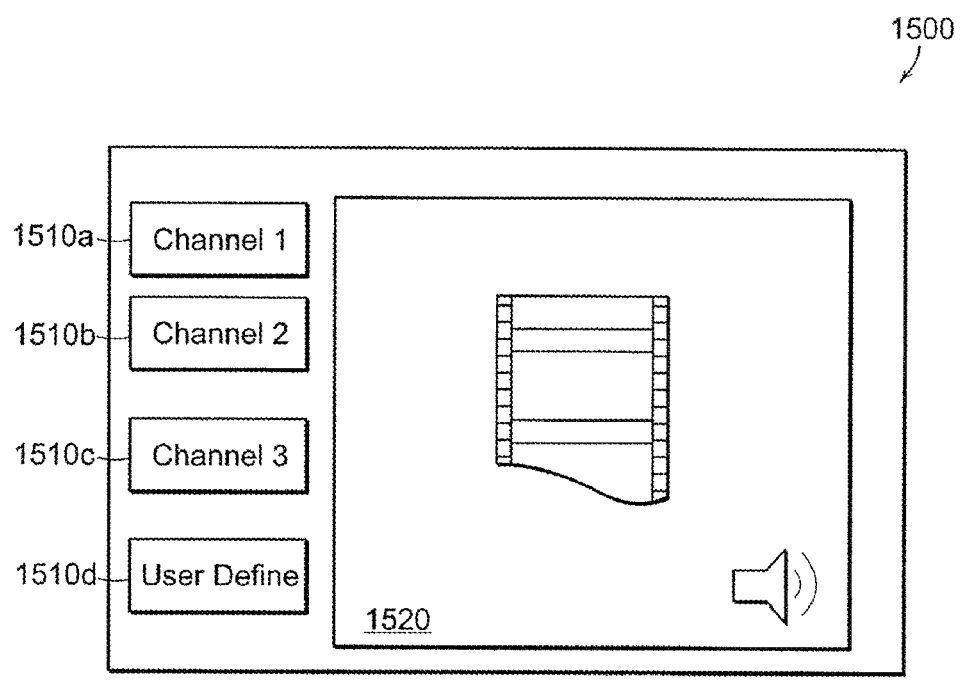

FIG. 12 provides a diagram illustrating an exemplary user interface for channel selection.

FIG. 13 is a diagram that illustrates an exemplary metadata document including a timed segment index.

DETAILED DESCRIPTION

Generation of Enhanced Metadata for Audio/Video

The invention features an automated method and apparatus for generating metadata enhanced for audio/video search-driven applications. The apparatus includes a media indexer that obtains an media file/stream (e.g., audio/video podcasts), applies one or more automated media processing techniques to the media file/stream, combines the results of the media processing into metadata enhanced for audio/video search, and stores the enhanced metadata in a searchable index or other data repository.

Figure 1A:
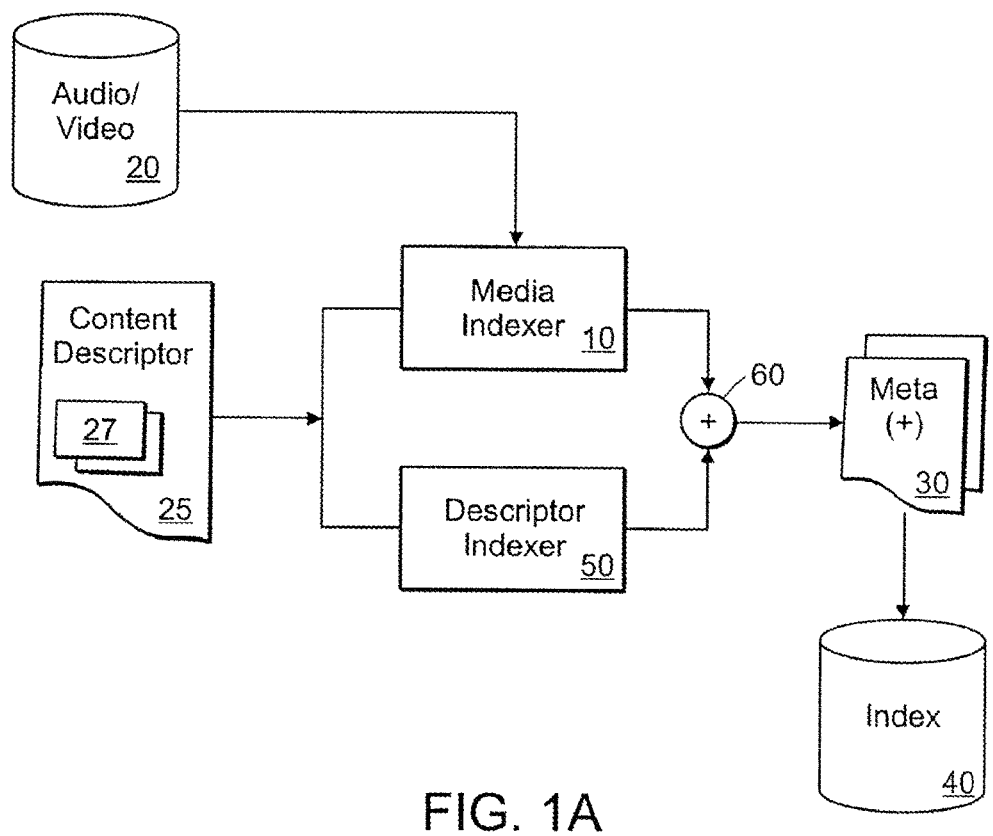
FIG. 1A is a diagram illustrating an apparatus and method for generating metadata enhanced for audio/video search-driven applications.

FIG. 1A is a diagram illustrating an apparatus and method for generating metadata enhanced for audio/video search-driven applications. As shown, the media indexer 10 cooperates with a descriptor indexer 50 to generate the enhanced metadata 30. A content descriptor 25 is received and processed by both the media indexer 10 and the descriptor indexer 50. For example, if the content descriptor 25 is a Really Simple Syndication (RSS) document, the metadata 2 corresponding to one or more audio/video podcasts includes a title, summary, and location (e.g., URL link) for each podcast. The descriptor indexer 50 extracts the descriptor metadata 2 from the text and embedded metatags of the content descriptor 25 and outputs it to a combiner 60. The content descriptor 25 can also be a simple web page link to a media file. The link can contain information in the text of the link that describes the file and can also include attributes in the HTML that describe the target media file.

In parallel, the media indexer 10 reads the metadata 27 from the content descriptor 25 and downloads the audio/video podcast 20 from the identified location. The media indexer 10 applies one or more automated media processing techniques to the downloaded podcast and outputs the combined results to the combiner 60. At the combiner 60, the metadata information from the media indexer 10 and the descriptor indexer 50 are combined in a predetermined format to form the enhanced metadata 30. The enhanced metadata 30 is then stored in the index 40 accessible to search-driven applications such as those disclosed herein.

In other embodiments, the descriptor indexer 50 is optional and the enhanced metadata is generated by the media indexer 10.

Figure 1B:
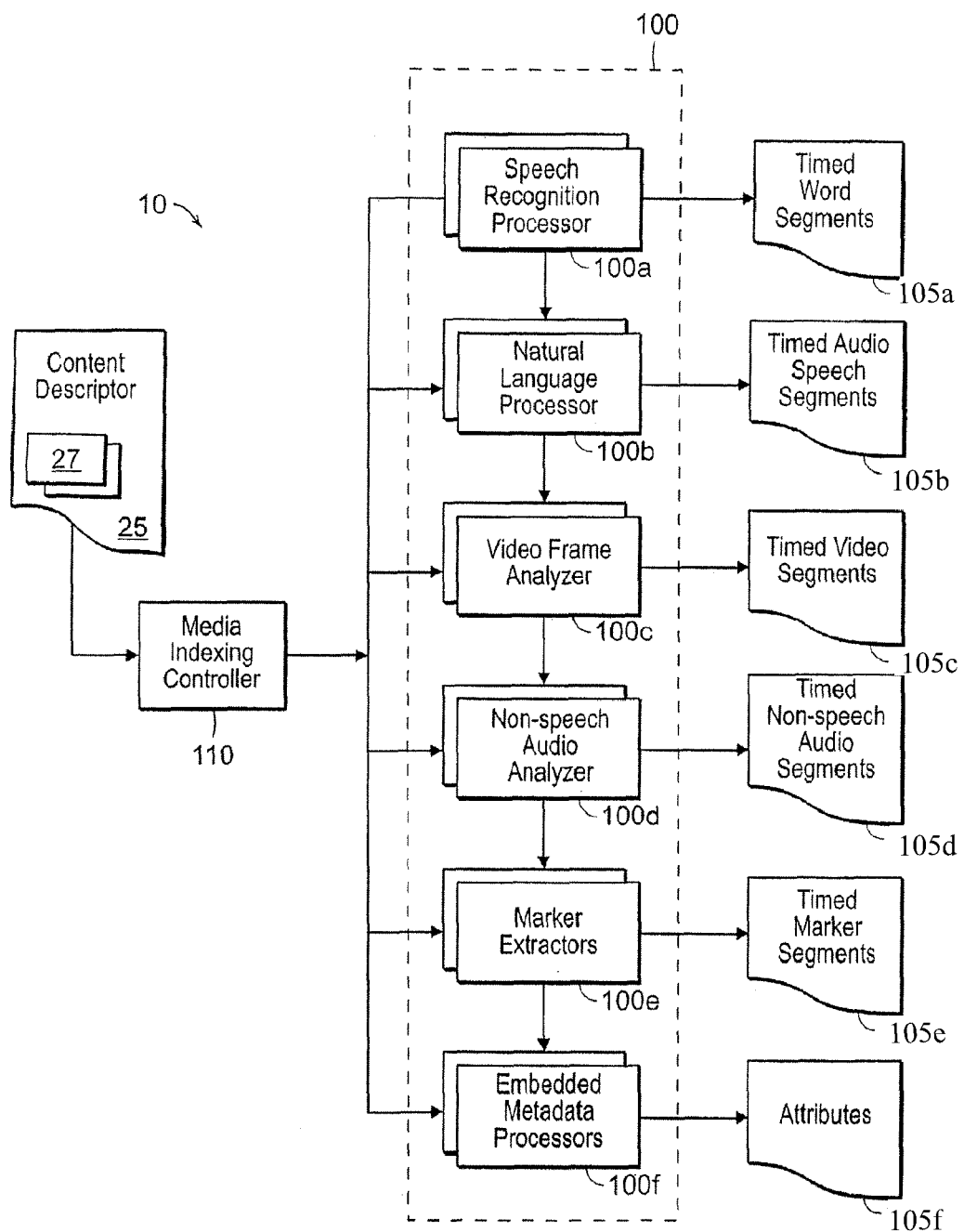
FIG. 1B is a diagram illustrating an example of a media indexer.

FIG. 1B is a diagram illustrating an example of a media indexer. As shown, the media indexer 10 includes a bank of media processors 100 that are managed by a media indexing controller 110. The media indexing controller 110 and each of the media processors 100 can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

A content descriptor 25 is fed into the media indexing controller 110, which allocates one or more appropriate media processors 100a . . . 100n to process the media files/streams 20 identified in the metadata 27. Each of the assigned media processors 100 obtains the media file/stream (e.g., audio/video podcast) and applies a predefined set of audio or video processing routines to derive a portion of the enhanced metadata from the media content.

Examples of known media processors 100 include speech recognition processors 100a, natural language processors 100b, video frame analyzers 100c, non-speech audio analyzers 100d, marker extractors 100e and embedded metadata processors 100f. Other media processors known to those skilled in the art of audio and video analysis can also be implemented within the media indexer. The results of such media processing define timing boundaries of a number of content segment within a media file/stream, including timed word segments 105a, timed audio speech segments 105b, timed video segments 105c, timed non-speech audio segments 105d, timed marker segments 105e, as well as miscellaneous content attributes 105f, for example.

Figure 2:
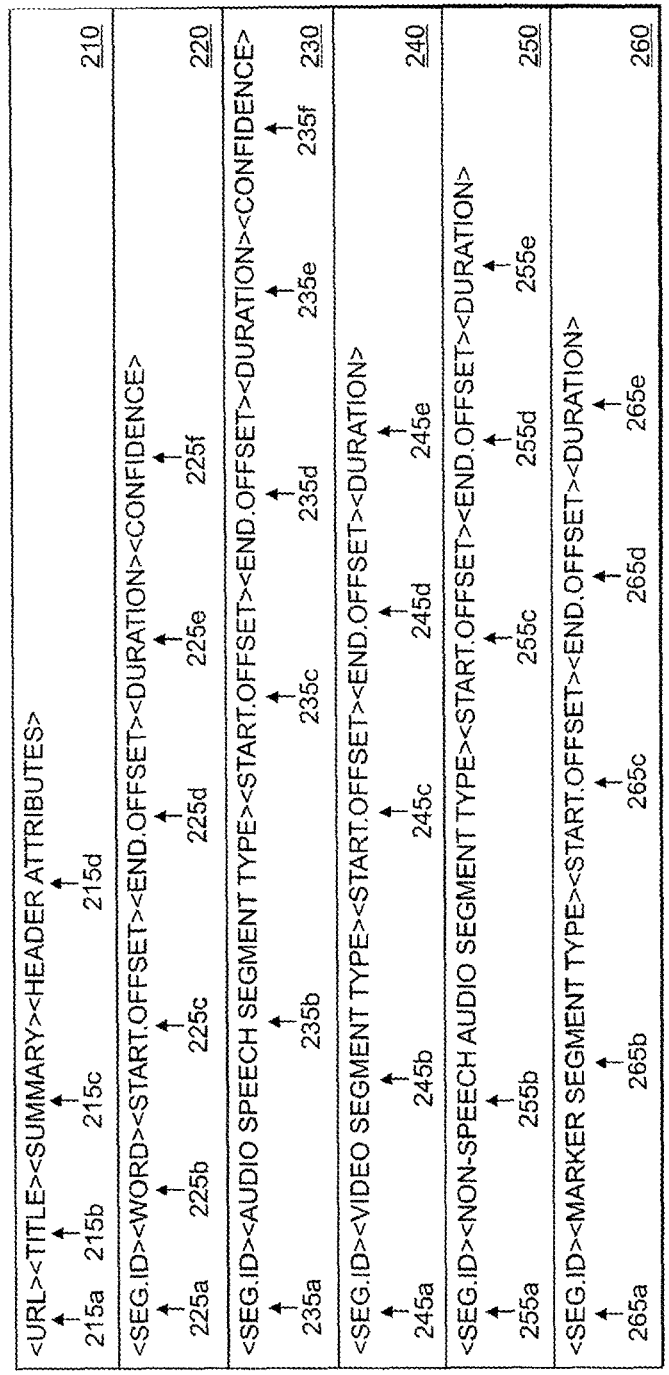
FIG. 2 is a diagram illustrating an example of metadata enhanced for audio/video search-driven applications.

FIG. 2 is a diagram illustrating an example of metadata enhanced for audio/video search-driven applications. As shown, the enhanced metadata 200 include metadata 210 corresponding to the underlying media content generally. For example, where the underlying media content is an audio/video podcast, metadata 210 can include a URL 215a, title 215b, summary 215c, and miscellaneous content attributes 215d. Such information can be obtained from a content descriptor by the descriptor indexer 50. An example of a content descriptor is a Really Simple Syndication (RSS) document that is descriptive of one or more audio/video podcasts. Alternatively, such information can be extracted by an embedded metadata processor 100f from header fields embedded within the media file/stream according to a predetermined format.

The enhanced metadata 200 further identifies individual segments of audio/video content and timing information that defines the boundaries of each segment within the media file/stream. For example, in FIG. 2, the enhanced metadata 200 includes metadata that identifies a number of possible content segments within a typical media file/stream, namely word segments, audio speech segments, video segments, non-speech audio segments, and/or marker segments, for example.

The metadata 220 includes descriptive parameters for each of the timed word segments 225, including a segment identifier 225a, the text of an individual word 225b, timing information defining the boundaries of that content segment (i.e., start offset 225c, end offset 225d, and/or duration 225e), and optionally a confidence score 225f. The segment identifier 225a uniquely identifies each word segment amongst the content segments identified within the metadata 200. The text of the word segment 225b can be determined using a speech recognition processor 100a or parsed from closed caption data included with the media file/stream. The start offset 225c is an offset for indexing into the audio/video content to the beginning of the content segment. The end offset 225d is an offset for indexing into the audio/video content to the end of the content segment. The duration 225e indicates the duration of the content segment. The start offset, end offset and duration can each be represented as a timestamp, frame number or value corresponding to any other indexing scheme known to those skilled in the art. The confidence score 225f is a relative ranking (typically between 0 and 1) provided by the speech recognition processor 100a as to the accuracy of the recognized word.

The metadata 230 includes descriptive parameters for each of the timed audio speech segments 235, including a segment identifier 235a, an audio speech segment type 235b, timing information defining the boundaries of the content segment (e.g., start offset 235c, end offset 235d, and/or duration 235e), and optionally a confidence score 235f. The segment identifier 235a uniquely identifies each audio speech segment amongst the content segments identified within the metadata 200. The audio speech segment type 235b can be a numeric value or string that indicates whether the content segment includes audio corresponding to a phrase, a sentence, a paragraph, story or topic, particular gender, and/or an identified speaker. The audio speech segment type 235b and the corresponding timing information can be obtained using a natural language processor 100b capable of processing the timed word segments from the speech recognition processors 100a and/or the media file/stream 20 itself. The start offset 235c is an offset for indexing into the audio/video content to the beginning of the content segment. The end offset 235d is an offset for indexing into the audio/video content to the end of the content segment. The duration 235e indicates the duration of the content segment. The start offset, end offset and duration can each be represented as a timestamp, frame number or value corresponding to any other indexing scheme known to those skilled in the art. The confidence score 235f can be in the form of a statistical value (e.g., average, mean, variance, etc.) calculated from the individual confidence scores 225f of the individual word segments.

The metadata 240 includes descriptive parameters for each of the timed video segments 245, including a segment identifier 225a, a video segment type 245b, and timing information defining the boundaries of the content segment (e.g., start offset 245c, end offset 245d, and/or duration 245e). The segment identifier 245a uniquely identifies each video segment amongst the content segments identified within the metadata 200. The video segment type 245b can be a numeric value or string that indicates whether the content segment corresponds to video of an individual scene, watermark, recognized object, recognized face, or overlay text. The video segment type 245b and the corresponding timing information can be obtained using a video frame analyzer 100c capable of applying one or more image processing techniques. The start offset 235c is an offset for indexing into the audio/video content to the beginning of the content segment. The end offset 235d is an offset for indexing into the audio/video content to the end of the content segment. The duration 235e indicates the duration of the content segment. The start offset, end offset and duration can each be represented as a timestamp, frame number or value corresponding to any other indexing scheme known to those skilled in the art.

The metadata 250 includes descriptive parameters for each of the timed non-speech audio segments 25 include a segment identifier 225a, a non-speech audio segment type 255b, and timing information defining the boundaries of the content segment (e.g., start offset 255c, end offset 255d, and/or duration 255e). The segment identifier 255a uniquely identifies each non-speech audio segment amongst the content segments identified within the metadata 200. The audio segment type 235b can be a numeric value or string that indicates whether the content segment corresponds to audio of non-speech sounds, audio associated with a speaker emotion, audio within a range of volume levels, or sound gaps, for example. The non-speech audio segment type 255b and the corresponding timing information can be obtained using a non-speech audio analyzer 100d. The start offset 255c is an offset for indexing into the audio/video content to the beginning of the content segment. The end offset 255d is an offset for indexing into the audio/video content to the end of the content segment. The duration 255e indicates the duration of the content segment. The start offset, end offset and duration can each be represented as a timestamp, frame number or value corresponding to any other indexing scheme known to those skilled in the art.

The metadata 260 includes descriptive parameters for each of the timed marker segments 265, including a segment identifier 265a, a marker segment type 265b, timing information defining the boundaries of the content segment (e.g., start offset 265c, end offset 265d, and/or duration 265e). The segment identifier 265a uniquely identifies each video segment amongst the content segments identified within the metadata 200. The marker segment type 265b can be a numeric value or string that can indicates that the content segment corresponds to a predefined chapter or other marker within the media content (e.g., audio/video podcast). The marker segment type 265b and the corresponding timing information can be obtained using a marker extractor 100e to obtain metadata in the form of markers (e.g., chapters) that are embedded within the media content in a manner known to those skilled in the art.

By generating or otherwise obtaining such enhanced metadata that identifies content segments and corresponding timing information from the underlying media content, a number of for audio/video search-driven applications can be implemented as described herein.

Audio/Video Search Snippets

According to another aspect, the invention features a computerized method and apparatus for generating and presenting search snippets that enable user-directed navigation of the underlying audio/video content. The method involves obtaining metadata associated with discrete media content that satisfies a search query. The metadata identifies a number of content segments and corresponding timing information derived from the underlying media content using one or more automated media processing techniques. Using the timing information identified in the metadata, a search result or "snippet" can be generated that enables a user to arbitrarily select and commence playback of the underlying media content at any of the individual content segments.

Figure 3:
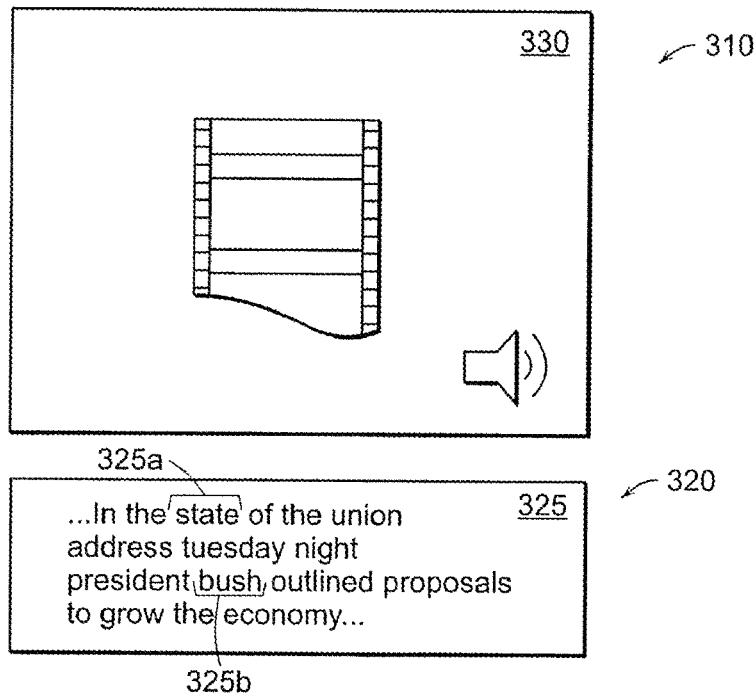
FIG. 3 is a diagram illustrating an example of a search snippet that enables user-directed navigation of underlying media content.

FIG. 3 is a diagram illustrating an example of a search snippet that enables user-directed navigation of underlying media content. The search snippet 310 includes a text area 320 displaying the text 32 of the words spoken during one or more content segments of the underlying media content. A media player 330 capable of audio/video playback is embedded within the search snippet or alternatively executed in a separate window.

The text 32 for each word in the text area 320 is preferably mapped to a start offset of a corresponding word segment identified in the enhanced metadata. For example, an object (e.g. SPAN object) can be defined for each of the displayed words in the text area 320. The object defines a start offset of the word segment and an event handler. Each start offset can be a timestamp or other indexing value that identifies the start of the corresponding word segment within the media content. Alternatively, the text 32 for a group of words can be mapped to the start offset of a common content segment that contains all of those words. Such content segments can include a audio speech segment, a video segment, or a marker segment, for example, as identified in the enhanced metadata of FIG. 2.

Playback of the underlying media content occurs in response to the user selection of a word and begins at the start offset corresponding to the content segment mapped to the selected word or group of words. User selection can be facilitated, for example, by directing a graphical pointer over the text area 320 using a pointing device and actuating the pointing device once the pointer is positioned over the text 32 of a desired word. In response, the object event handler provides the media player 330 with a set of input parameters, including a link to the media file/stream and the corresponding start offset, and directs the player 330 to commence or otherwise continue playback of the underlying media content at the input start offset.

For example, referring to FIG. 3, if a user clicks on the word 325a, the media player 330 begins to plays back the media content at the audio/video segment starting with "state of the union address . . . " Likewise, if the user clicks on the word 325b, the media player 330 commences playback of the audio/video segment starting with "bush outlined . . . ."

An advantage of this aspect of the invention is that a user can read the text of the underlying audio/video content displayed by the search snippet and then actively "jump to" a desired segment of the media content for audio/video playback without having to listen to or view the entire media stream.

Figure 4:
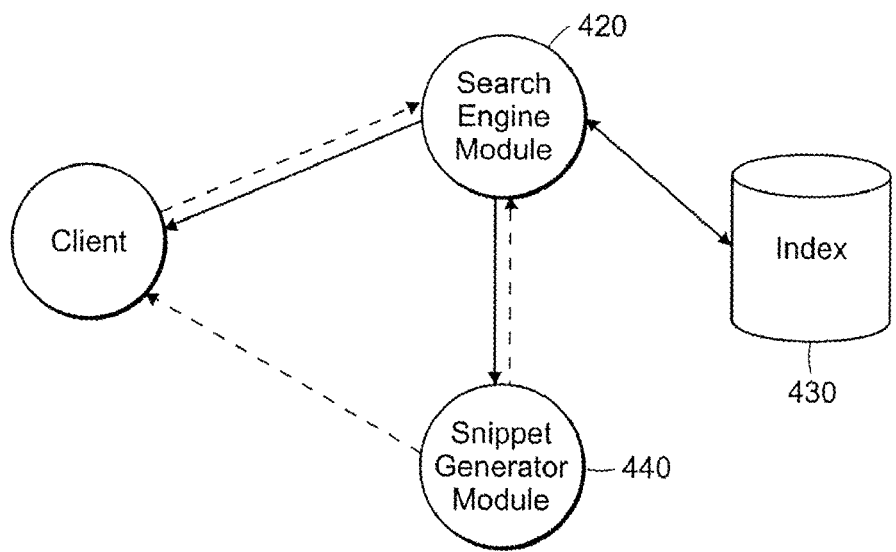
FIGS. 4 and 5 are diagrams illustrating a computerized method and apparatus for generating search snippets that enable user navigation of the underlying media content.
Figure 5:
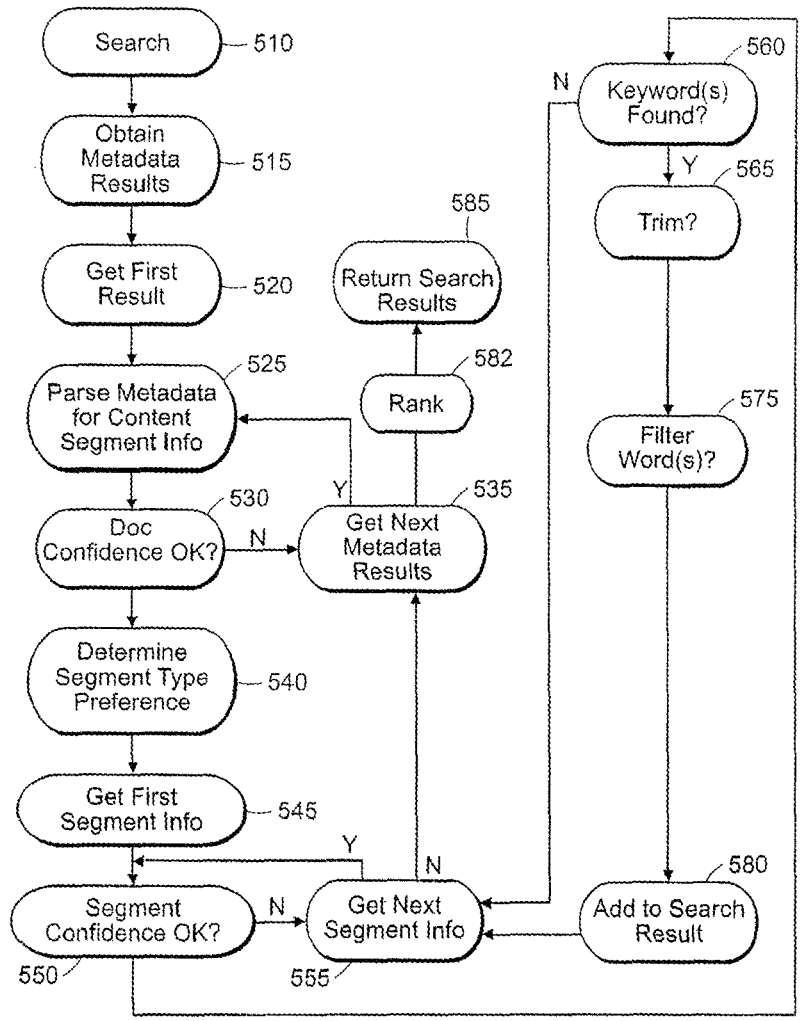

FIGS. 4 and 5 are diagrams illustrating a computerized method and apparatus for generating search snippets that enable user navigation of the underlying media content. Referring to FIG. 4, a client 410 interfaces with a search engine module 420 for searching an index 430 for desired audio/video content. The index includes a plurality of metadata associated with a number of discrete media content and enhanced for audio/video search as shown and described with reference to FIG. 2. The search engine module 420 also interfaces with a snippet generator module 440 that processes metadata satisfying a search query to generate the navigable search snippet for audio/video content for the client 410. Each of these modules can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

FIG. 5 is a flow diagram illustrating a computerized method for generating search snippets that enable user-directed navigation of the underlying audio/video content. At step 510, the search engine 420 conducts a keyword search of the index 430 for a set of enhanced metadata documents satisfying the search query. At step 515, the search engine 420 obtains the enhanced metadata documents descriptive of one or more discrete media files/streams (e.g., audio/video podcasts).

At step 520, the snippet generator 440 obtains an enhanced metadata document corresponding to the first media file/stream in the set. As previously discussed with respect to FIG. 2, the enhanced metadata identifies content segments and corresponding timing information defining the boundaries of each segment within the media file/stream.

At step 525, the snippet generator 440 reads or parses the enhanced metadata document to obtain information on each of the content segments identified within the media file/stream. For each content segment, the information obtained preferably includes the location of the underlying media content (e.g. URL), a segment identifier, a segment type, a start offset, an end offset (or duration), the word or the group of words spoken during that segment, if any, and an optional confidence score.

Step 530 is an optional step in which the snippet generator 440 makes a determination as to whether the information obtained from the enhanced metadata is sufficiently accurate to warrant further search and/or presentation as a valid search snippet. For example, as shown in FIG. 2, each of the word segments 22 includes a confidence score 225f assigned by the speech recognition processor 100a. Each confidence score is a relative ranking (typically between 0 and 1) as to the accuracy of the recognized text of the word segment. To determine an overall confidence score for the enhanced metadata document in its entirety, a statistical value (e.g., average, mean, variance, etc.) can be calculated from the individual confidence scores of all the word segments 225.

Thus, if, at step 530, the overall confidence score falls below a predetermined threshold, the enhanced metadata document can be deemed unacceptable from which to present any search snippet of the underlying media content. Thus, the process continues at steps 53 and 52 to obtain and read/parse the enhanced metadata document corresponding to the next media file/stream identified in the search at step 510. Conversely, if the confidence score for the enhanced metadata in its entirety equals or exceeds the predetermined threshold, the process continues at step 540.

At step 540, the snippet generator 440 determines a segment type preference. The segment type preference indicates which types of content segments to search and present as snippets. The segment type preference can include a numeric value or string corresponding to one or more of the segment types. For example, if the segment type preference can be defined to be one of the audio speech segment types, e.g., "story," the enhanced metadata is searched on a story-by-story basis for a match to the search query and the resulting snippets are also presented on a story-by-story basis. In other words, each of the content segments identified in the metadata as type "story" are individually searched for a match to the search query and also presented in a separate search snippet if a match is found. Likewise, the segment type preference can alternatively be defined to be one of the video segment types, e.g., individual scene. The segment type preference can be fixed programmatically or user configurable.

At step 545, the snippet generator 440 obtains the metadata information corresponding to a first content segment of the preferred segment type (e.g., the first story segment). The metadata information for the content segment preferably includes the location of the underlying media file/stream, a segment identifier, the preferred segment type, a start offset, an end offset (or duration) and an optional confidence score. The start offset and the end offset/duration define the timing boundaries of the content segment. By referencing the enhanced metadata, the text of words spoken during that segment, if any, can be determined by identifying each of the word segments falling within the start and end offsets. For example, if the underlying media content is an audio/video podcast of a news program and the segment preference is "story," the metadata information for the first content segment includes the text of the word segments spoken during the first news story.

Step 550 is an optional step in which the snippet generator 440 makes a determination as to whether the metadata information for the content segment is sufficiently accurate to warrant further search and/or presentation as a valid search snippet. This step is similar to step 530 except that the confidence score is a statistical value (e.g., average, mean, variance, etc.) calculated from the individual confidence scores of the word segments 22 falling within the timing boundaries of the content segment.

If the confidence score falls below a predetermined threshold, the process continues at step 55 to obtain the metadata information corresponding to a next content segment of the preferred segment type. If there are no more content segments of the preferred segment type, the process continues at step 53 to obtain the enhanced metadata document corresponding to the next media file/stream identified in the search at step 510. Conversely, if the confidence score of the metadata information for the content segment equals or exceeds the predetermined threshold, the process continues at step 560.

At step 560, the snippet generator 440 compares the text of the words spoken during the selected content segment, if any, to the keyword(s) of the search query. If the text derived from the content segment does not contain a match to the keyword search query, the metadata information for that segment is discarded. Otherwise, the process continues at optional step 565.

At optional step 565, the snippet generator 440 trims the text of the content segment (as determined at step 545) to fit within the boundaries of the display area (e.g., text area 320 of FIG. 3). According to one embodiment, the text can be trimmed by locating the word(s) matching the search query and limiting the number of additional words before and after. According to another embodiment, the text can be trimmed by locating the word(s) matching the search query, identifying another content segment that has a duration shorter than the segment type preference and contains the matching word(s), and limiting the displayed text of the search snippet to that of the content segment of shorter duration. For example, assuming that the segment type preference is of type "story," the displayed text of the search snippet can be limited to that of segment type "sentence" or "paragraph".

At optional step 575, the snippet generator 440 filters the text of individual words from the search snippet according to their confidence scores. For example, in FIG. 2, a confidence score 225f is assigned to each of the word segments to represent a relative ranking that corresponds to the accuracy of the text of the recognized word. For each word in the text of the content segment, the confidence score from the corresponding word segment 22 is compared against a predetermined threshold value. If the confidence score for a word segment falls below the threshold, the text for that word segment is replaced with a predefined symbol (e.g., - - - ). Otherwise no change is made to the text for that word segment.

At step 580, the snippet generator 440 adds the resulting metadata information for the content segment to a search result for the underlying media stream/file. Each enhanced metadata document that is returned from the search engine can have zero, one or more content segments containing a match to the search query. Thus, the corresponding search result associated with the media file/stream can also have zero, one or more search snippets associated with it. An example of a search result that includes no search snippets occurs when the metadata of the original content descriptor contains the search term, but the timed word segments 105a of FIG. 2 do not. The process returns to step 555 to obtain the metadata information corresponding to the next content snippet segment of the preferred segment type. If there are no more content segments of the preferred segment type, the process continues at step 535 to obtain the enhanced metadata document corresponding to the next media file/stream identified in the search at step 510. If there are no further metadata results to process, the process continues at optional step 582 to rank the search results before sending to the client 410.

At optional step 582, the snippet generator 440 ranks and sorts the list of search results. One factor for determining the rank of the search results can include confidence scores. For example, the search results can be ranked by calculating the sum, average or other statistical value from the confidence scores of the constituent search snippets for each search result and then ranking and sorting accordingly. Search results being associated with higher confidence scores can be ranked and thus sorted higher than search results associated with lower confidence scores. Other factors for ranking search results can include the publication date associated with the underlying media content and the number of snippets in each of the search results that contain the search term or terms. Any number of other criteria for ranking search results known to those skilled in the art can also be utilized in ranking the search results for audio/video content.

At step 585, the search results can be returned in a number of different ways. According to one embodiment, the snippet generator 440 can generate a set of instructions for rendering each of the constituent search snippets of the search result as shown in FIG. 3, for example, from the raw metadata information for each of the identified content segments. Once the instructions are generated, they can be provided to the search engine 420 for forwarding to the client. If a search result includes a long list of snippets, the client can display the search result such that a few of the snippets are displayed along with an indicator that can be selected to show the entire set of snippets for that search result. Although not so limited, such a client includes (i) a browser application that is capable of presenting graphical search query forms and resulting pages of search snippets; (ii) a desktop or portable application capable of, or otherwise modified for, subscribing to a service and receiving alerts containing embedded search snippets (e.g., RSS reader applications); or (iii) a search applet embedded within a DVD (Digital Video Disc) that allows users to search a remote or local index to locate and navigate segments of the DVD audio/video content.

According to another embodiment, the metadata information contained within the list of search results in a raw data format are forwarded directly to the client 410 or indirectly to the client 410 via the search engine 420. The raw metadata information can include any combination of the parameters including a segment identifier, the location of the underlying content (e.g., URL or filename), segment type, the text of the word or group of words spoken during that segment (if any), timing information (e.g., start offset, end offset, and/or duration) and a confidence score (if any). Such information can then be stored or further processed by the client 410 according to application specific requirements. For example, a client desktop application, such as iTunes Music Store available from Apple Computer, Inc., can be modified to process the raw metadata information to generate its own proprietary user interface for enabling user-directed navigation of media content, including audio/video podcasts, resulting from a search of its Music Store repository.

Figure 6A:
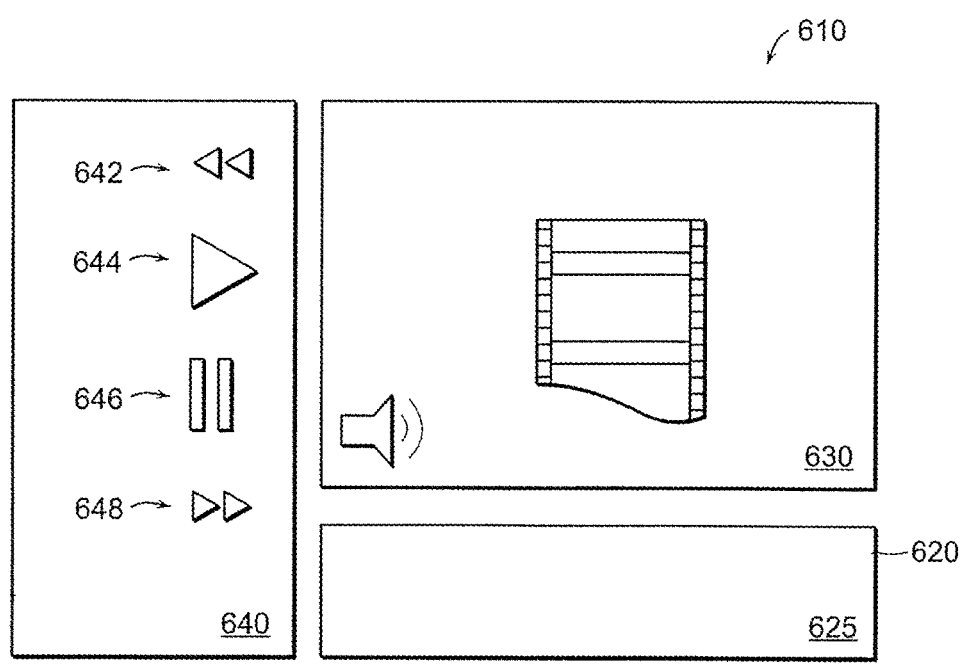
FIG. 6A is a diagram illustrating another example of a search snippet that enables user navigation of the underlying media content.

FIG. 6A is a diagram illustrating another example of a search snippet that enables user navigation of the underlying media content. The search snippet 610 is similar to the snippet described with respect to FIG. 3, and additionally includes a user actuated display element 640 that serves as a navigational control. The navigational control 640 enables a user to control playback of the underlying media content. The text area 620 is optional for displaying the text 625 of the words spoken during one or more segments of the underlying media content as previously discussed with respect to FIG. 3.

Typical fast forward and fast reverse functions cause media players to jump ahead or jump back during media playback in fixed time increments. In contrast, the navigational control 640 enables a user to jump from one content segment to another segment using the timing information of individual content segments identified in the enhanced metadata.

As shown in FIG. 6A, the user-actuated display element 640 can include a number of navigational controls (e.g., Back 642, Forward 648, Play 644, and Pause 646). The Back 642 and Forward 648 controls can be configured to enable a user to jump between word segments, audio speech segments, video segments, non-speech audio segments, and marker segments. For example, if an audio/video podcast includes several content segments corresponding to different stories or topics, the user can easily skip such segments until the desired story or topic segment is reached.

Figure 6B:
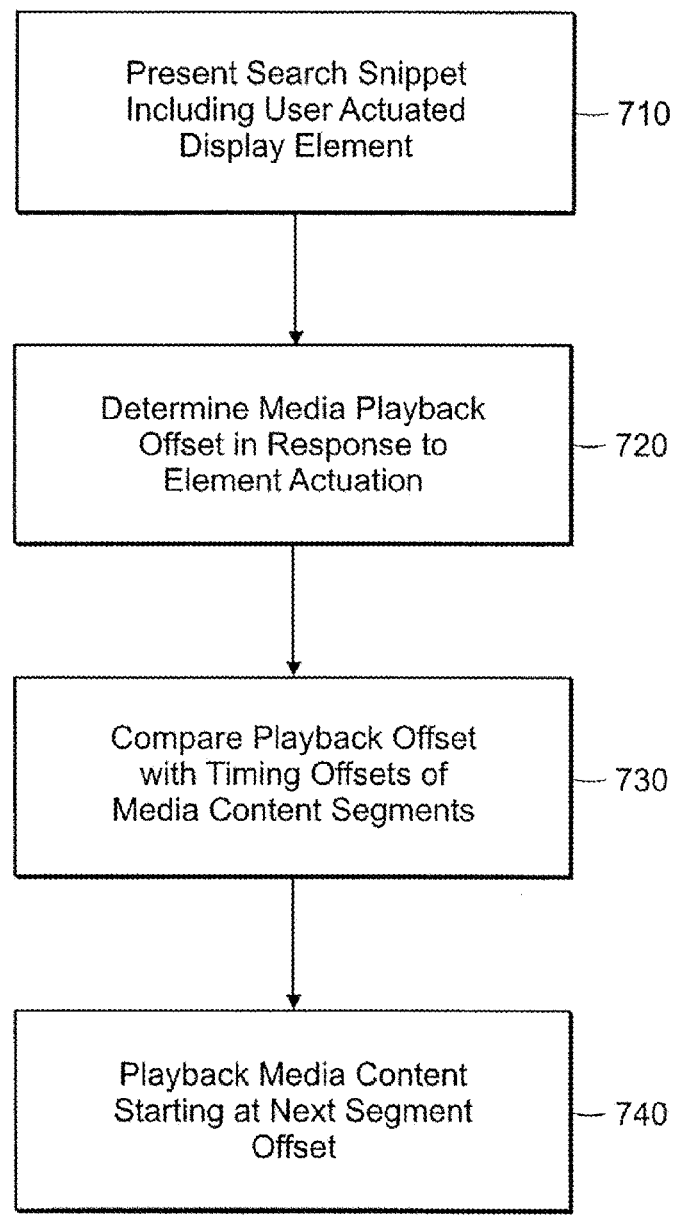
FIGS. 6B and 6C are diagrams illustrating a method for navigating media content using the search snippet of FIG. 6A.
Figure 6C:
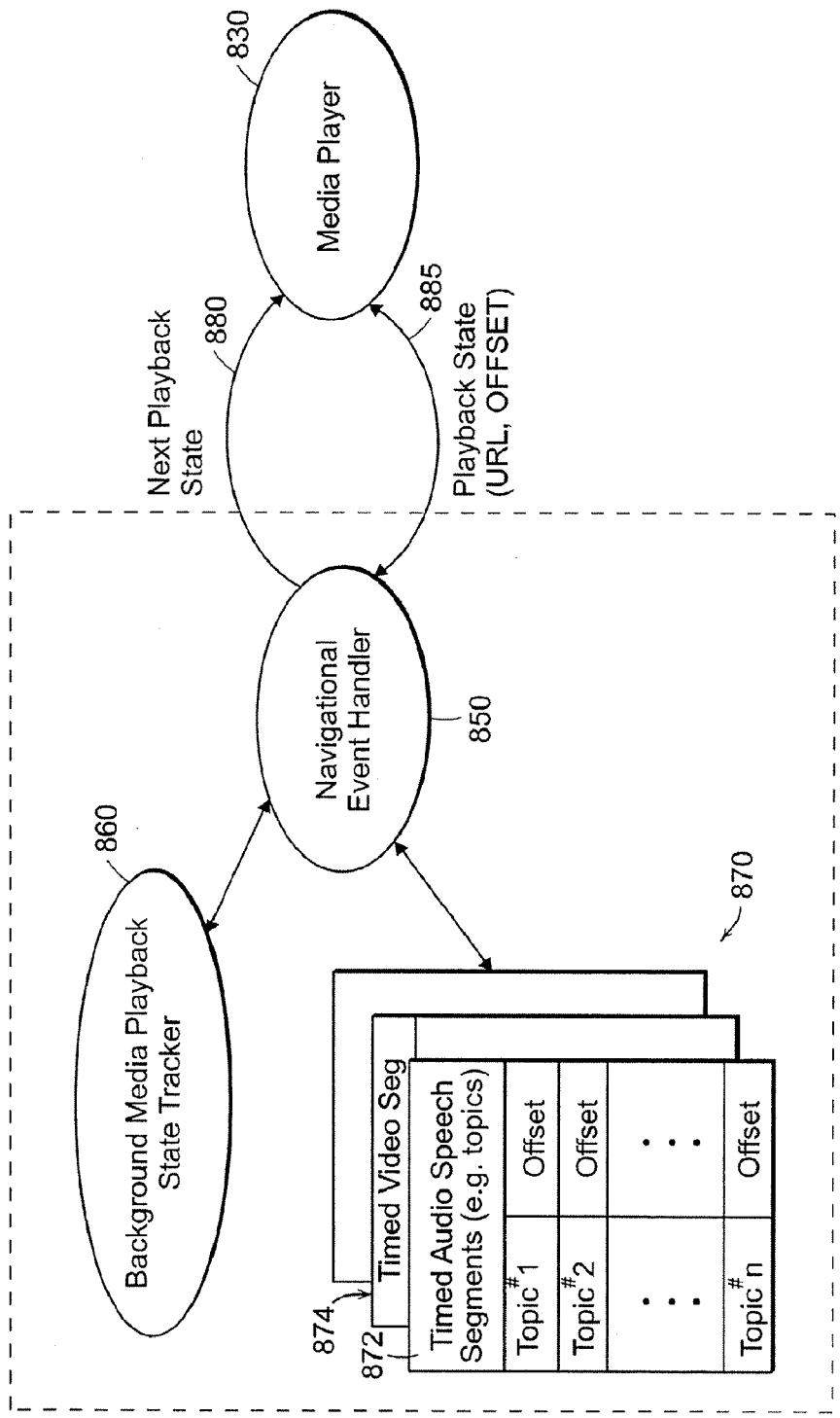

FIGS. 6B and 6C are diagrams illustrating a method for navigating media content using the search snippet of FIG. 6A. At step 710, the client presents the search snippet of FIG. 6A, for example, that includes the user actuated display element 640. The user-actuated display element 640 includes a number of individual navigational controls (i.e., Back 642, Forward 648, Play 644, and Pause 646). Each of the navigational controls 642, 644, 646, 648 is associated with an object defining at least one event handler that is responsive to user actuations. For example, when a user clicks on the Play control 644, the object event handler provides the media player 630 with a link to the media file/stream and directs the player 630 to initiate playback of the media content from the beginning of the file/stream or from the most recent playback offset.

At step 720, in response to an indication of user actuation of Forward 648 and Back 642 display elements, a playback offset associated with the underlying media content in playback is determined. The playback offset can be a timestamp or other indexing value that varies according to the content segment presently in playback. This playback offset can be determined by polling the media player or by autonomously tracking the playback time.

For example, as shown in FIG. 6C, when the navigational event handler 850 is triggered by user actuation of the Forward 648 or Back 642 control elements, the playback state of media player module 830 is determined from the identity of the media file/stream presently in playback (e.g., URL or filename), if any, and the playback timing offset. Determination of the playback state can be accomplished by a sequence of status request/response 85 signaling to and from the media player module 830. Alternatively, a background media playback state tracker module 860 can be executed that keeps track of the identity of the media file in playback and maintains a playback clock (not shown) that tracks the relative playback timing offsets.

At step 730 of FIG. 6B, the playback offset is compared with the timing information corresponding to each of the content segments of the underlying media content to determine which of the content segments is presently in playback. As shown in FIG. 6C, once the media file/stream and playback timing offset are determined, the navigational event handler 850 references a segment list 870 that identifies each of the content segments in the media file/stream and the corresponding timing offset of that segment. As shown, the segment list 870 includes a segment list 872 corresponding to a set of timed audio speech segments (e.g., topics). For example, if the media file/stream is an audio/video podcast of an episode of a daily news program, the segment list 872 can include a number of entries corresponding to the various topics discussed during that episode (e.g., news, weather, sports, entertainment, etc.) and the time offsets corresponding to the start of each topic. The segment list 870 can also include a video segment list 872 or other lists (not shown) corresponding to timed word segments, timed non-speech audio segments, and timed marker segments, for example. The segment lists 870 can be derived from the enhanced metadata or can be the enhanced metadata itself.

At step 740 of FIG. 6B, the underlying media content is played back at an offset that is prior to or subsequent to the offset of the content segment presently in playback. For example, referring to FIG. 6C, the event handler 850 compares the playback timing offset to the set of predetermined timing offsets in one or more of the segment lists 870 to determine which of the content segments to playback next. For example, if the user clicked on the "forward" control 848, the event handler 850 obtains the timing offset for the content segment that is greater in time than the present playback offset. Conversely, if the user clicks on the "backward" control 842, the event handler 850 obtains the timing offset for the content segment that is earlier in time than the present playback offset. After determining the timing offset of the next segment to play, the event handler 850 provides the media player module 830 with instructions 880 directing playback of the media content at the next playback state (e.g., segment offset and/or URL).

Thus, an advantage of this aspect of the invention is that a user can control media using a client that is capable of jumping from one content segment to another segment using the timing information of individual content segments identified in the enhanced metadata. One particular application of this technology can be applied to portable player devices, such as the iPod audio/video player available from Apple Computer, Inc. For example, after downloading a podcast to the iPod, it is unacceptable for a user to have to listen to or view an entire podcast if he/she is only interested in a few segments of the content. Rather, by modifying the internal operating system software of iPod, the control buttons on the front panel of the iPod can be used to jump from one segment to the next segment of the podcast in a manner similar to that previously described.

Media Merge

According to another aspect of the invention, the invention features a computerized method and apparatus for merging content segments from a number of discrete media content for playback. Previously, if a user wanted to listen to or view a particular topic available in a number of audio/video podcasts, the user had to download each of the podcasts and then listen to or view the entire podcast content until the desired topic was reached. Even if the media player included the ability to fast forward media playback, the user would more than likely not know when the beginning of the desired topic segment began. Thus, even if the podcast or other media file/stream contained the desired content, the user would have to expend unnecessary effort in "fishing" for the desired content in each podcast.

In contrast, embodiments of the invention obtain metadata corresponding to a plurality of discrete media content, such that the metadata identifies content segments and their corresponding timing information. Preferably the metadata of at least one of the plurality of discrete media content is derived using one or more media processing techniques. The media processing techniques can include automated techniques such as those previously described with respect to FIGS. 1B and 2. The media processing techniques can also include manual techniques. For example, the content creator could insert chapter markers at specific times into the media file. One can also write a text summary of the content that includes timing information. A set of the content segments are then selected and merged for playback using the timing information from each of the corresponding metadata.

According to one embodiment, the merged media content is implemented as a playlist that identifies the content segments to be merged for playback. The playlist includes timing information for accessing these segments during playback within each of the corresponding media files/streams (e.g., podcasts) and an express or implicit playback order of the segments. The playlist and each of the corresponding media files/streams are provided in their entirety to a client for playback, storage or further processing.

According to another embodiment, the merged media content is generated by extracting the content segments to be merged for playback from each of the media files/streams (e.g., podcasts) and then merging the extracted segments into one or more merged media files/streams. Optionally, a playlist can be provided with the merged media files/streams to enable user control of the media player to navigate from one content segment to another as opposed to merely fast forwarding or reversing media playback in fixed time increments. The one or more merged media files/streams and the optional playlist are then provided to the client for playback, storage or further processing.

Figure 7:
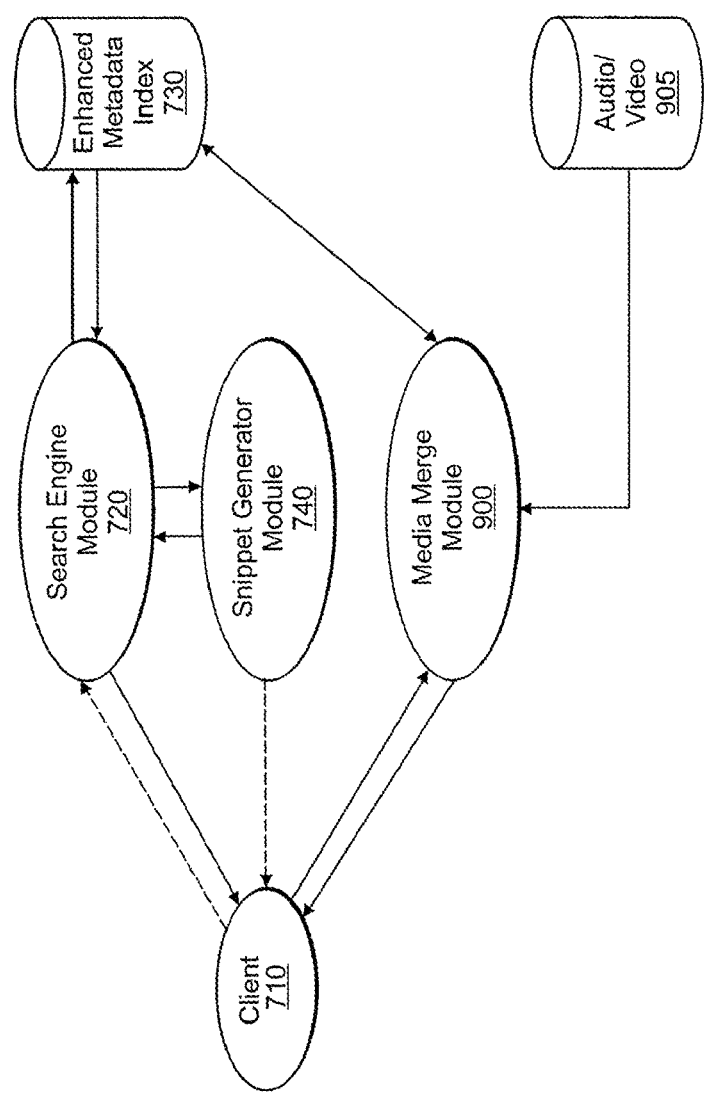
FIG. 7 is a diagram illustrating an apparatus for merging content segments for playback.

FIG. 7 is a diagram illustrating an apparatus for merging content segments for playback. As shown, a client 710 interfaces with a search engine 720 for searching an index 730 for desired audio/video content. The index 730 includes a plurality of metadata associated with a number of discrete media content with each enhanced for audio/video search as shown and described with reference to FIG. 2. The search engine 720 interfaces with a snippet generator 740 that processes the metadata satisfying a search query, resulting in a number of search snippets being generated to present audio/video content. After presentation of the search snippets, the client 710, under direction of a user, interfaces with a media merge module 900 in order to merge content segments of user interest 905 for playback, storage or further processing at the client 710.

Figure 8:
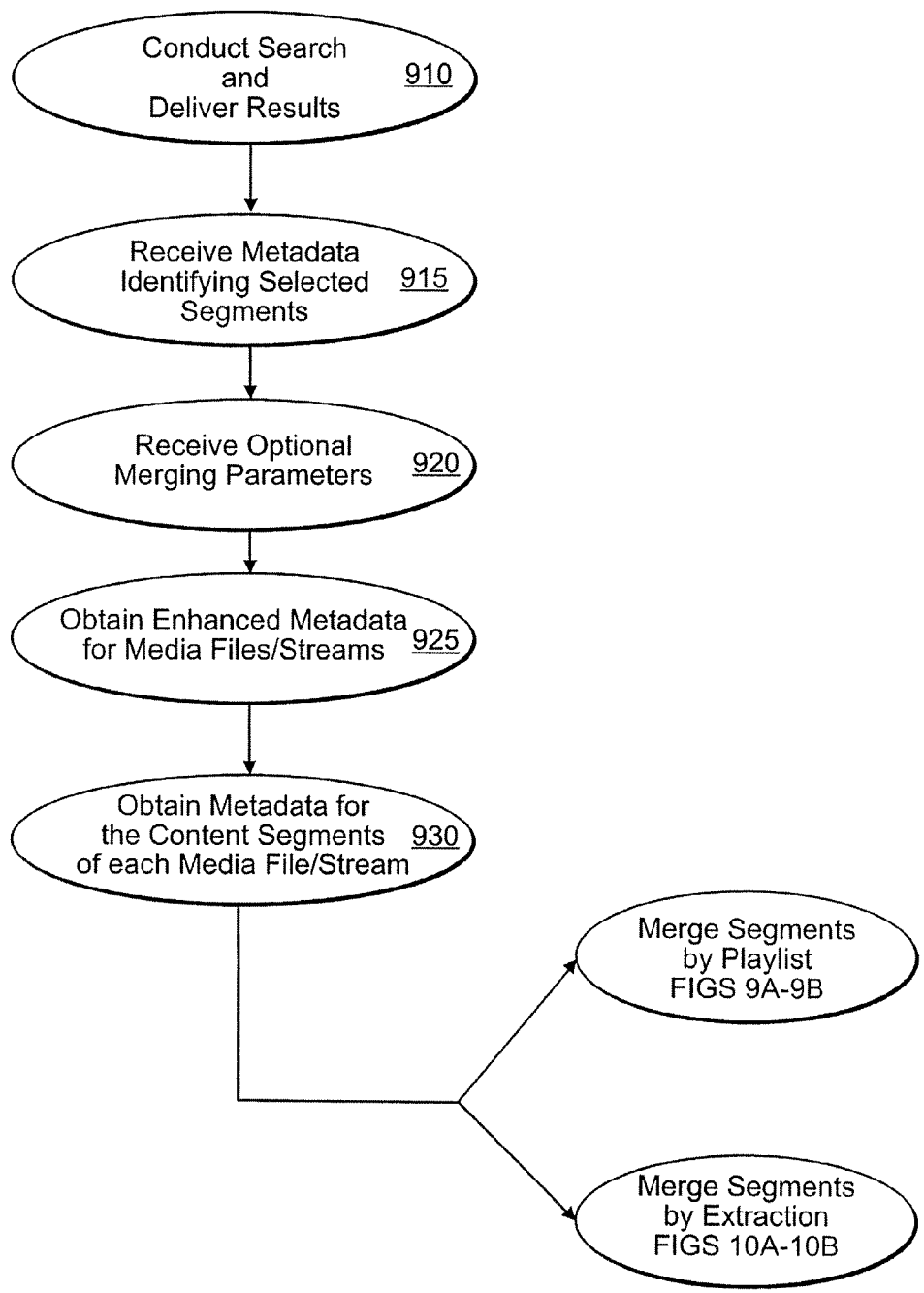
FIG. 8 is a flow diagram illustrating a computerized method for merging content segments for playback.

FIG. 8 is a flow diagram illustrating a computerized method for merging content segments for playback. At step 910, the search engine 720 conducts a keyword search of the index 730 for metadata enhanced for audio/video search that satisfies a search query. Subsequently, the search engine 720, or alternatively the snippet generator 740 itself, downloads a set of metadata information or instructions to enable presentation of a set of search snippets at the client 710 as previously described.

At step 915, the client 710, under the direction of a user, selects a number of the content segments to merge for playback by selecting the corresponding snippets. Snippet selection can be implemented in any number of ways know to those skilled in the art. For example, the user interface presenting each of the search snippets at the client 710 can provide a checkbox for each snippet. After enabling the checkboxes corresponding to each of the snippets of interest, a button or menu item is provided to enable the user to submit the metadata information identifying each of the selected content segments to the media merge module 900. Such metadata information includes, for example, the segment identifiers and the locations of the underlying media content (e.g. URL links or filenames). The client 710 transmits, and the media merge module 900 receives, the selected segment identifiers and the corresponding locations of the underlying media content.

At optional step 920, the client 710 additionally transmits, and the media merge module 900 receives, a set of parameters for merging the content segments. For example, one parameter can define a total duration which cannot be exceeded by the cumulative duration of the merged content segments. Another parameter can specify a preference for merging the individual content segments into one or more media files. Such parameters can be user-defined, programmatically defined, or fixed.

At step 925, the media merge module 900 obtains the enhanced metadata corresponding to each of the underlying media files/streams containing the selected content segments. For example, the media merge module 900 can obtain the enhanced metadata by conducting a search of the index 730 for each of the metadata according to the locations of the underlying media content (e.g., URL links) submitted by the client 710.

At step 930, the media merge module 900 parses or reads each of the individual enhanced metadata corresponding to the underlying media content (e.g., audio/video podcasts). Using the segment identifiers submitted by the client 710, the media merge module 900 obtains the metadata information for each of the content segments from each of the individual enhanced metadata. The metadata information obtained includes the segment identifier, a start offset, and an end offset (or duration). In other embodiments, the metadata information can be provided to the media merge module 900 at step 915, and thus make steps 925 and 930 unnecessary. Once the metadata information for the content segments is obtained, the media merge module 900 can implement the merged media content according to a first embodiment described with respect to FIGS. 9A-9B or a second embodiment described with respect to FIGS. 10A-10B.

Figure 9A:
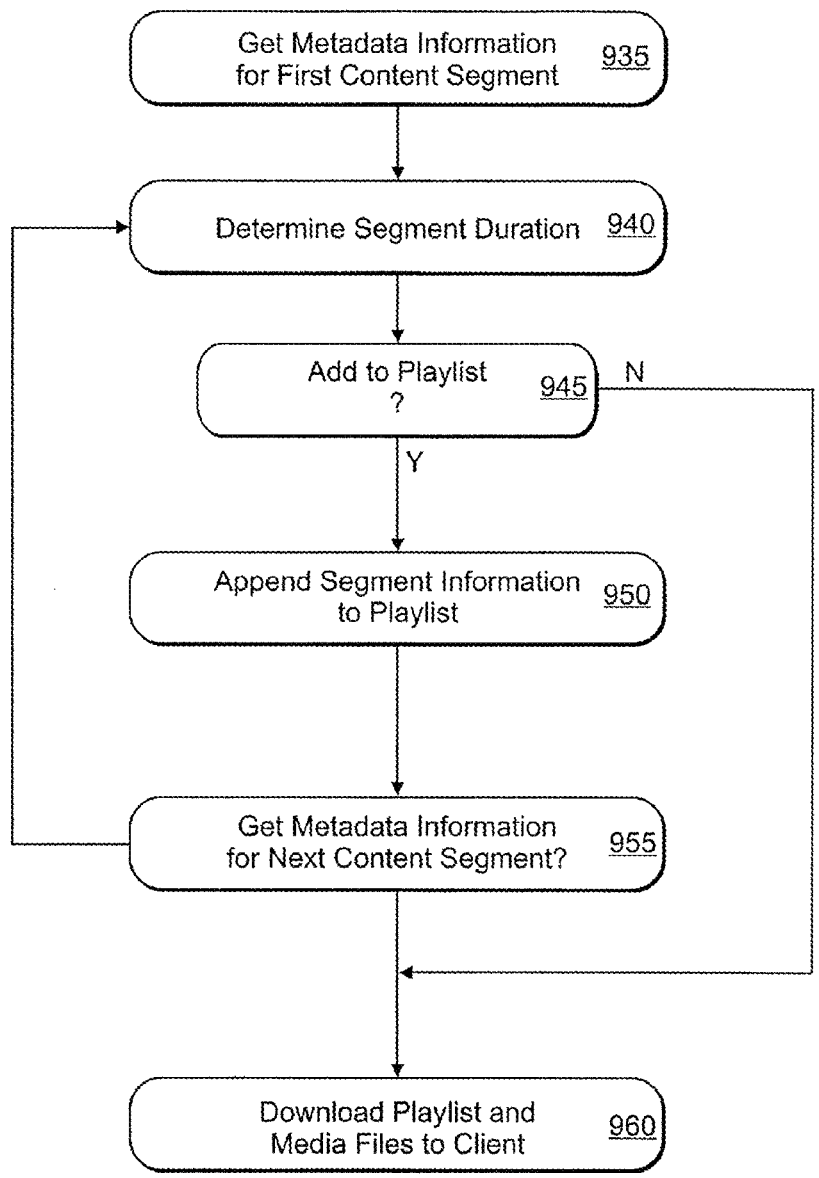
FIGS. 9A and 9B are diagrams illustrating a computerized method for merging content segments for playback according to the first embodiment.
Figure 9B:
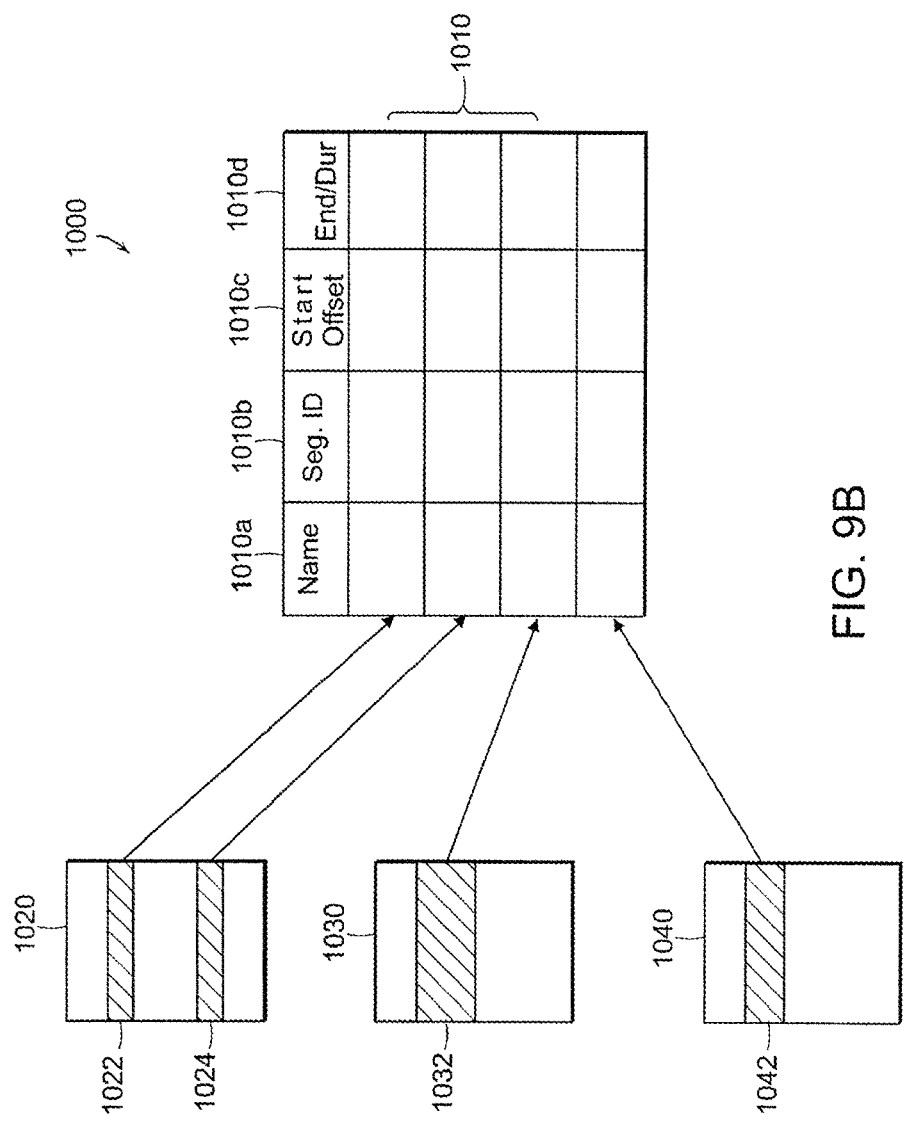

FIGS. 9A and 9B are diagrams illustrating a computerized method for merging content segments for playback according to the first embodiment. In this first embodiment, a playlist that identifies the content segments to be merged for playback is generated using the timing information from the metadata. The playlist identifies the selected content segments and corresponding timing information for accessing the selected content segments within each of a number of discrete media content. The plurality of discrete media content and the generated play list are downloaded to a client for playback, storage or further processing.

At step 935, the media merge module 900 obtains the metadata information for the first content segment (as determined at step 915 or 930), including a segment identifier, a start offset, and an end offset (or duration). At step 940, the media merge module 900 determines the duration of the selected segment. The segment duration can be calculated as the difference of a start offset and an end offset. Alternatively, the segment duration can be provided as a predetermined value.

At step 945, the media merge module 900 determines whether to add the content segment to the playlist based on cumulative duration. For example, if the cumulative duration of the selected content segments, which includes the segment duration for the current content segment, exceeds the total duration (determined at step 920), the content segment is not added to the playlist and the process proceeds to step 960 to download the playlist and optionally each of the media files or streams identified in the playlist to the client 710. Conversely, if the addition of the content segment does not cause the cumulative duration to exceed the total duration, the content segment is added to the playlist at 950.

At step 950, the media merge module 900 updates the playlist by appending the location of the underlying media content (e.g., filename or URL link), the start offset, and end offset (or duration) from the metadata information of the enhanced metadata for that content segment. For example, FIG. 9B is a diagram representing a playlist merging individual content segments for playback from a plurality of discrete media content. As shown, the playlist 1000 provides an entry for each of the selected segments, namely segments 1022, 1024, 1032, and 104 from each of the underlying media files/streams 1020, 1030 and 1040. Each entry includes a filename 1010*a*, a segment identifier 1010*b*, start offset 1010*c* and end offset or duration 1010*d*.

In operation, the timing information in the playlist 1000 can be used by a media player for indexing into each of the media files/streams to playback only those segments specifically designated by the user. For example, each of the content segments 1022, 1024, 103 and 104 may include stories on a particular topic. Instead of having to listen to or view each audio/video podcast 1020, 1030 and 1040 which may include many topics, the media player accesses and presents only those segments of the podcasts corresponding to specific topics of user interest.

Referring back to FIG. 9A at step 955, the media merge module 900 obtains the metadata information for the next content segment, namely a segment identifier, a start offset, and an end offset or duration (as determined at step 915 or 930) and continues at step 935 to repeat the process for adding the next content segment to the playlist. If there are no further content segments selected for addition to the merged playlist, the process continues at step 960. At step 960, the playlist is downloaded to the client and optionally further downloads the underlying media content in their entirety to the client for playback, storage or further processing of the merged media content.

Figure 10A:
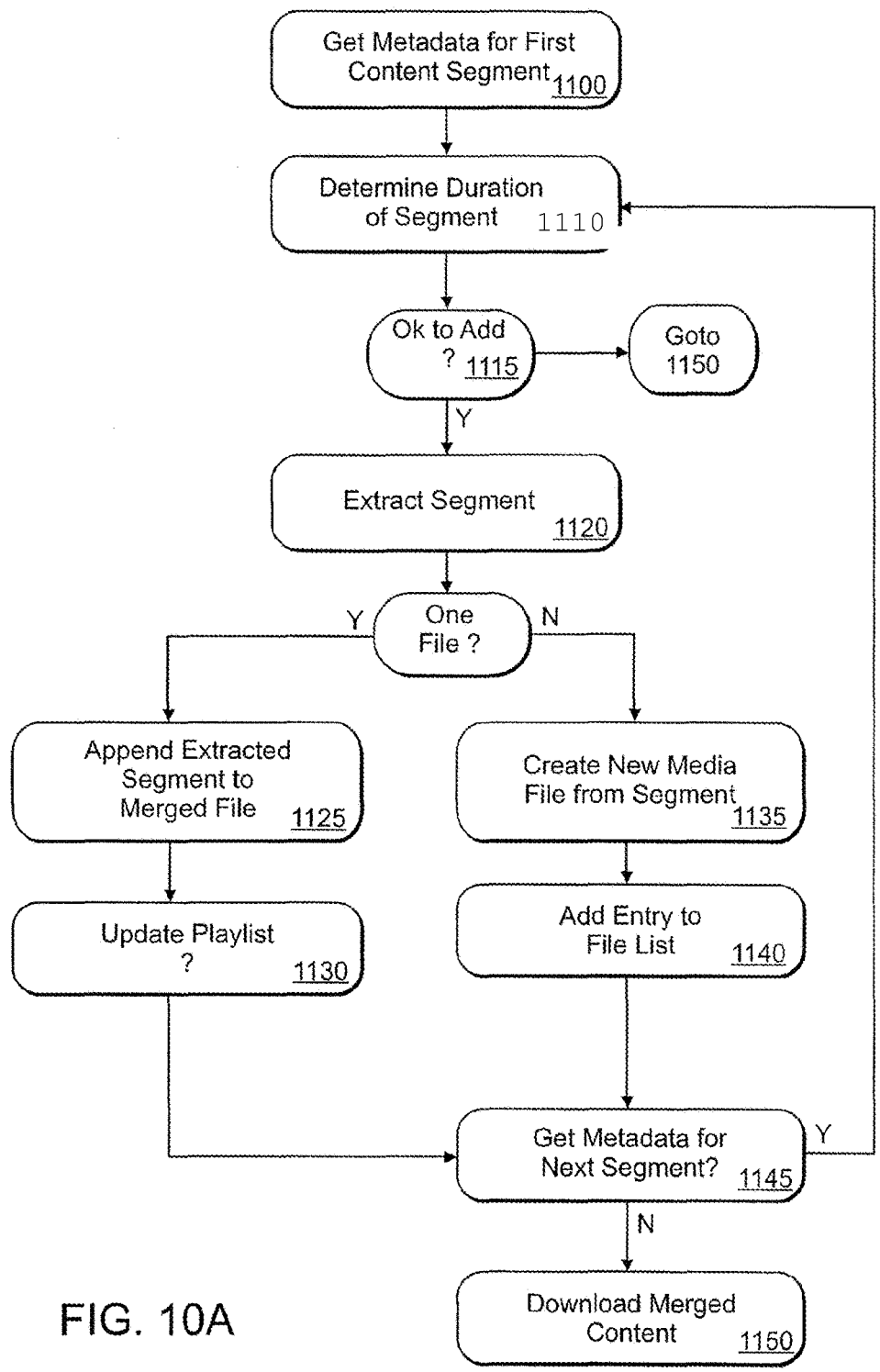
FIGS. 10A-10C are diagrams illustrating a computerized method for merging content segments for playback according to the second embodiment.
Figure 10B:
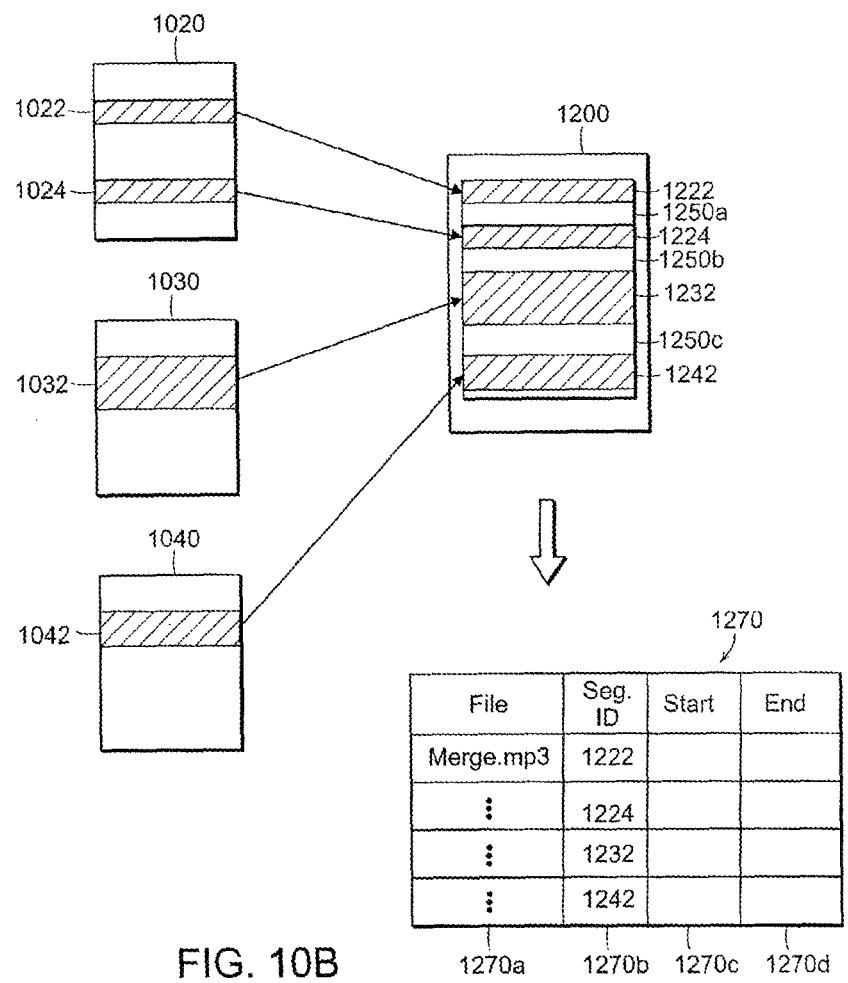
Figure 10C:
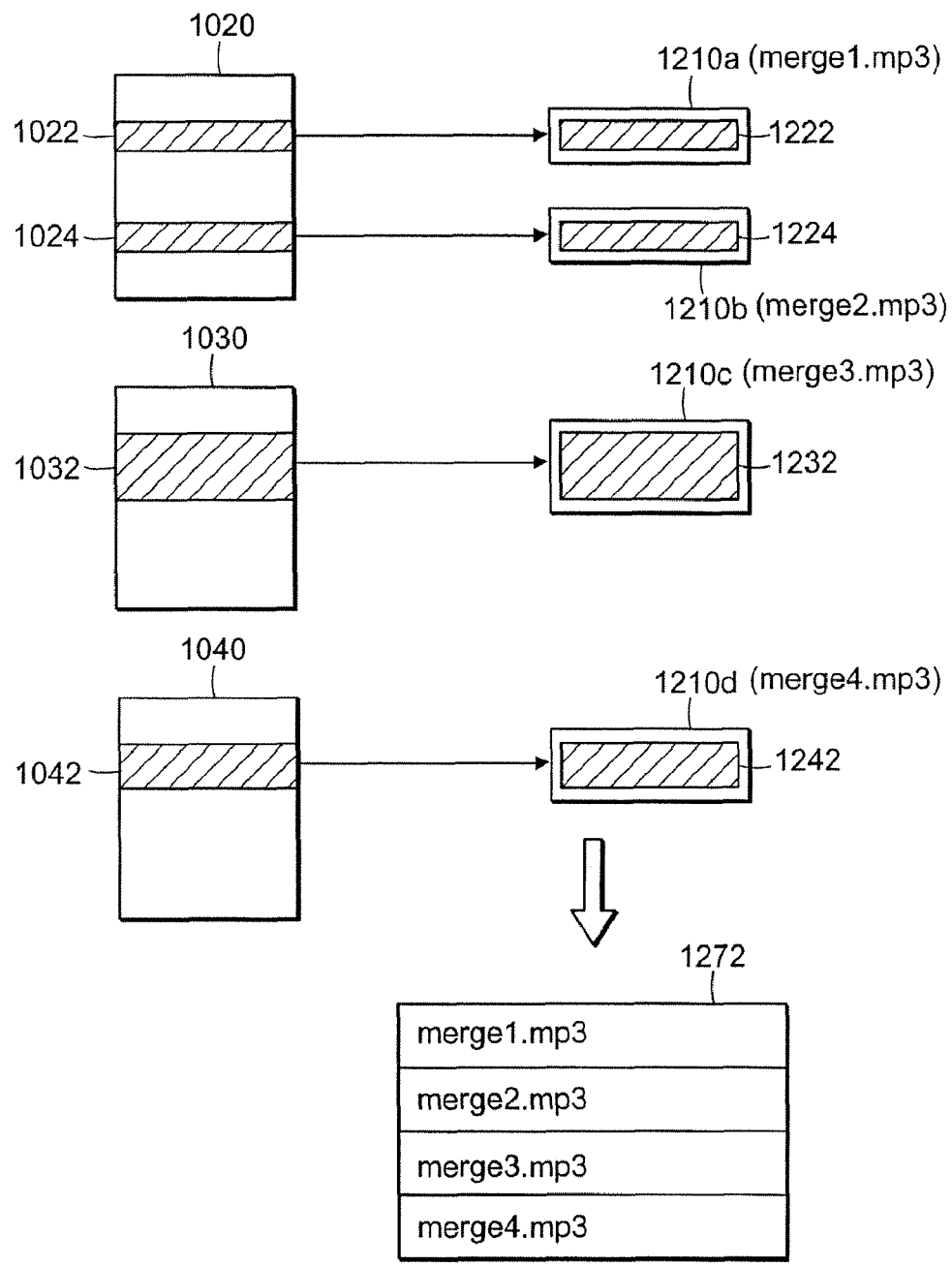

FIGS. 10A-10C are diagrams illustrating a computerized method for merging content segments for playback according to the second embodiment. In the second embodiment, the merged media content is generated by extracting the selected content segments from each of the underlying media files/streams using the timing information from the corresponding metadata. The extracted content segments are then merged into one or more discrete media files/streams and downloaded to a client for playback, storage or further processing. In particular embodiments, a playlist can also be generated that identifies the selected content segments and corresponding timing information for accessing the selected content segments within the merged media file(s). Using the playlist, a user can control the media player to navigate from one content segment to another as opposed to merely fast forwarding or reversing media playback in fixed time increments.

At step 1100, the media merge module 900 obtains the metadata information for the first content segment, namely the segment identifier, the start offset, the end offset (or duration), and the location of the underlying media content (e.g., URL link). At step 1110, the media merge module 900 determines the duration of the selected segment. The segment duration can be calculated as the difference of a start offset and an end offset. Alternatively, the segment duration can be provided as a predetermined value. At step 1115, the media merge module 900 determines whether to merge the content segment along with other content segments for playback. For example, if the cumulative duration of the selected content segments, including the segment duration for the current content segment, exceeds the total duration (determined at step 920), the content segment is not added and the process proceeds to step 1150.

Conversely, the process continues at step 1120 if the addition of the content segment does not cause the cumulative duration to exceed the total duration. At step 1120, the media merge module 900 obtains a copy of the underlying media content from the location identified in the metadata information for the content segment. The media merge module 900 then extracts the content segment by cropping the underlying media content using the start offset and end offset (or duration) for that segment. The content segment can be cropped using any audio/video editing tool known to those skilled in the art.

Depending on whether the specified preference (as optionally determined at step 920) is to merge the individual content segments into one or more media files, the process can continue along a first track starting at step 1125 for generating a single merged file or stream. Alternatively, the process can continue along a second track starting at step 1135 for generating separate media files corresponding to each content segment.

At step 1125, where the preference is to merge the individual content segments into a single media file, the cropped segment of content from step 1120 is appended to the merged media file. Segment dividers may also be appended between consecutive content segments. For example, a segment divider can include silent content (e.g., no video/audio). Alternatively, a segment dividers can include audio/video content that provides advertising, facts or information. For example, FIG. 10B is a diagram that illustrates a number of content segments 1022, 1024, 1032, 1042 being extracted from the corresponding media files/streams 1020, 1030 and 1040 and merged into a single media file/stream 1200. FIG. 10B also illustrates segment dividers 1250*a*, 1250*b*, 1250*b* separating the individual segments 1222, 1224, 1232, 1242 of the merged file/stream 1200. As a result, the merged media file/stream 1200 enables a user to listen or view only the desired content from each of the discrete media content (e.g., audio/video podcasts).

Referring back to FIG. 10A at optional step 1130, the media merge module 900 can create/update a playlist that identifies timing information corresponding to each of the content segments merged into the single media file/stream. For example, as shown in FIG. 10B, a playlist 1270 can be generated that identifies the filename that is common to all segments 1270*a*, segment identifier 1270*b*, start offset of the content segment in the merged file/stream 1270*c* and end offset (or duration) of the segment 1270*d*. Using the playlist, a user can control the media player to navigate from one content segment to another as opposed to merely fast forwarding or reversing media playback in fixed time increments.

Referring back to FIG. 10A at step 1135, where the preference is to merge the individual content segments into a group of individual media files, a new media file/stream is created for the cropped segment (determined at step 1120).

At step 1140, the media merge module 900 also appends the filename of the newly created media file/stream to a file list. The file list identifies each of the media files corresponding to the merged media content.

For example, FIG. 10C is a diagram that illustrates a number of content segments 1022, 1024, 1032, 1042 being extracted from the corresponding media files/streams 1020, 1030 and 1040 and merged into multiple media files/streams 1210*a*, 1210*b*, 1210*c*, and 1210*d* (generally 1210). Each of the individual files/streams 1210 is associated with its own filename and can optionally include additional audio/video content that provides advertising, facts or information (not shown). FIG. 10C also illustrates a file list 127 identifying each of the individual files/streams (e.g., merge1.mpg, merge2.mpg, etc) that constitute the merged media content.

Referring back to FIG. 10A at step 1145, the media merge module 900 obtains the metadata information for the next content segment, namely the segment identifier, the start offset, the end offset (or duration), and the location of the underlying media content (e.g., URL link) and continues back at step 1110 to determine whether to merge the next content segment selected by the user. If, at step 1145, there are no further content segments to process or alternatively if, at step 1115, the media merge module make a determination not to merge the next content segment, the process continues at step 1150.

At step 1150, the media merge module 900 downloads the one or more media files/streams 1200, 1210 respectively for playback and optionally the playlist 1270 or file list 1272 to enable navigation among the individual content segments of the merged media file(s). For example, if the client is a desktop application, such as iTunes Music Store available from Apple Computer, Inc., the media files/streams and optional playlists/filelists can be downloaded to the iTunes application and then further downloaded from the iTunes application onto an iPod media player.

Virtual Channels Based on Media Search

According to a particular application of the media merge, the invention features a system and method for providing custom virtual media channels based on media searches. A virtual media channel can be implemented as a media file or stream of audio/video content. Alternatively, a virtual media channel can be implemented as a play list identifying a set of media files or streams, including an implied or express order of playback. The audio/video content of a virtual media channel can be customized by providing a rule set that defines instructions for obtaining media content that comprises the content for the media channel. In other words the rule set defines the content format of the channel. The rule set is defined such that at least one of the rules includes a keyword search for audio/video content, the results of which can be merged into the resulting content into a media file, stream or play list for virtual channel playback.

Figure 11A:
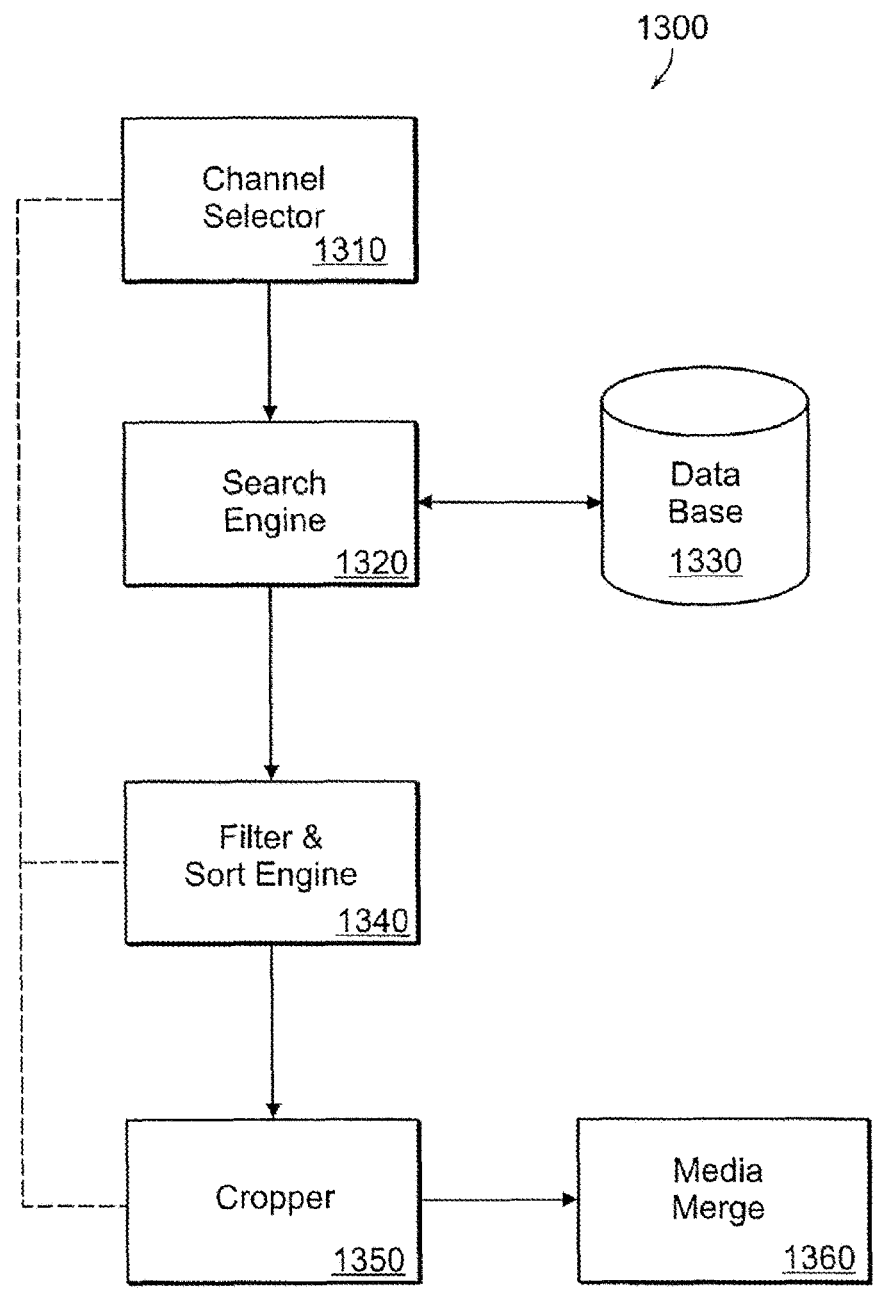
FIGS. 11A and 11B are diagrams illustrating a system and method, respectively, for providing a virtual media channel based on media search.
Figure 11B:
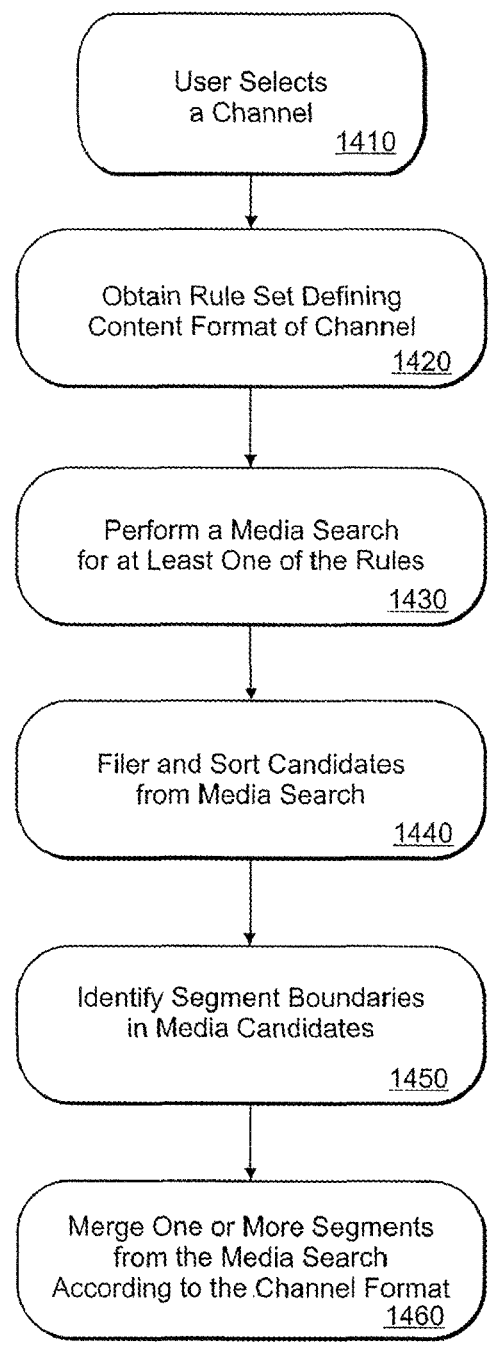

FIGS. 11A and 11B are diagrams illustrating a system and method, respectively, for providing a virtual media channel based on media search. FIG. 11A illustrates an exemplary system that includes a number of modules. As shown, the system includes a channel selector 1310, a search engine 1320, a database 1330, a filter and sort engine 1340, an optional segment cropper 1350, and a media merge module 1360. The media merge module 1360 can be implemented as previously described with respect to the first embodiment of FIGS. 9A-9B or the second embodiment of FIGS. 10A-10B. These component can be operated according to the method described with respect to FIG. 11B.

Referring to FIG. 11B at step 1410, a user selects a virtual media channel for playback through a user interface provided by the channel selector 1310. FIG. 1 provides a diagram illustrating an exemplary user interface for channel selection. As shown, FIG. 1 includes a graphical user interface 1500 including a media player 1520 and graphical icons (e.g., "buttons") that represent preset media channels 1510a, 1510b, 1510c and a user-defined channel 1510d. In this example, each of the channels offers access to a media stream generated from a segments of audio/video content that are merged together into a single media file, a common group of media files or a play list of such files. The media stream can be presented using the media player 1520. The preset channels 1510a-1510c can provide media streams customized to one or more specific topics selected by the content provider, while channel 1510d can provide media streams customized to one or more specific topics requested by a user.

Referring back to FIG. 11B at step 1420, the channel selector 1310 receives an indication of the selected channel and retrieves a set of rules and preferences defining the content format of the selected channel. The rules define instructions for obtaining media content (e.g. audio/video segments) that constitute the content for the virtual media channel. At least one of the rules includes instructions to execute a media search and to add one or more segments of audio/video content identified during the media search to the play list for the virtual media channel.

An exemplary rule set can specify a first rule with instructions to add a "canned" introduction for the virtual media channel (e.g., "Welcome to Sports Forum . . . "); a second rule with instructions to conduct a media search on a first topic (e.g. "steroids") and to add one or more of media segments resulting from that search; a third rule with instructions to conduct a media search on a second topic (e.g. "World Baseball Classic") and to add one or more of media segments resulting from that search; and a fourth rule with instructions to add a "canned" sign off (e.g., "Well, that's the end of the program. Thank you for joining us . . . "). The rule set can also allocate specific or relative numbers of media segments from each media search for inclusion in the content of the virtual media channel. The rule set can also define a maximum duration of the channel content. In the case of a user-defined media channel, the channel selector 1310 can provide a user interface (not shown) for selecting the topics for the media search, specifying allocations of the resulting media segments for the channel content, and define the maximum duration of the channel content.

The rule set can also include rules to insert advertisements, factual or information content as additional content for the virtual media channel. The advertisements can be arbitrarily selected from a pool of available advertisements, or alternatively, the advertisements can be related to the topic of a previous or subsequent media segment included in the content of the media channel. See U.S. patent application Ser. No. 11/395,608, filed on Mar. 31, 2006, for examples of dynamic presentation of factual, informational or advertising content. The entire teachings of this application being incorporated by reference in its entirety.

The preferences, which can be user defined, can include a maximum duration for playback over the virtual media channel. Preferences can also include a manner of delivering the content of the virtual media channel to the user (e.g., downloaded as a single merged media file or stream or as multiple media files or streams).

At step 1430, the channel selector 1310 directs the search engine 1320 to conduct a media search according to each rule specifying a media search on a specific topic. The search engine 1320 searches the database 1330 of metadata enhanced for audio/video search, such as the enhanced metadata previously described with respect to FIG. 2. In particular, by including the text of the audio portion of a media file or stream within the metadata descriptive of the media file or stream, which is segmented according to, for example, topics, stories, scenes, etc., the search engine 1320 can obtain accurate search results through key word searching. The metadata can also be segmented according to segments of other media channels. As a result of each media search, the search engine 1320 receives an individual set of enhanced metadata documents descriptive of one or more candidate media files or streams that satisfy the key word search query defined by a corresponding rule. For example, if a rule specified a search for the topic "steroids," the results of the media search can include a set of enhanced metadata documents for one or more candidate audio/video podcasts that include a reference to the keyword "steroids."

At step 1440, the filter and sort engine 1340 receives the individual sets of enhanced metadata documents with each set corresponding to a media search. Specifically, the engine 1340 applies a set of rules to filter and sort the metadata documents within each set.

For example, the filter and sort engine 1340 can be used to eliminate previously viewed media files. According to one embodiment, the filter and sort engine 1340 can maintain a history that includes the identity of the media files and streams previously used as content for the virtual media channel. By comparing the identity information in an enhanced metadata document (e.g., file name, link, etc.) with the history data, the filter and sort engine 1340 can eliminate media files or streams as candidates whose identity information is included in the history data.

The filter and sort engine 1340 can be used to eliminate, or alternatively sort, media files or streams sourced from undesired sites. According to one embodiment, the filter and sort engine 1340 can maintain a site list data structure that lists links to specific sources of content that are "preferred" and "not preferred" as identified by a user or content provider. By comparing the source of a media file or stream from the identity information in an enhanced metadata document (e.g., file name, link, etc.) with the site list data, the filter and sort engine 1340 can eliminate media files or streams as candidates from sources that are not preferred. Conversely, the filter and sort engine 1340 can use the site list data to sort the enhanced metadata documents according to whether or not the corresponding media file or stream is sourced from a preferred site. According to another embodiment, the site list data can list links to specific sources of content to which the content provider or user is authorized to access and whose content can be included in the virtual media channel.

The filter and sort engine 1340 can be used to sort the media files or streams according to relevance or other ranking criteria. For example, each set of metadata documents results from a media search defined by one of the rules in the rule set. By using the keywords from the media search query, the engine 1340 can track the keyword counts across the metadata documents in the set. Documents having higher keyword counts can be considered to be more relevant than documents having lower keyword counts. Thus, the media files can be sorted accordingly with the media files associated with more relevant metadata documents preceding the media files associated with less relevant metadata documents. Other known methods of ranking media files or streams known to those skilled in the art can also be used to filter and sort the individual sets of metadata. For example, the metadata can be sorted based on the date and time.

At step 1450, an optional segment cropper 1350 determines the boundaries of the audio/video segment containing the keywords of the media searches. For example, FIG. 13 is a diagram that illustrates an exemplary metadata document including a timed segment index. With respect to the exemplary metadata document 1600, the segment cropper 1350 can search for the keyword "steroids" within the set of timed word segments 1610 that provide the text of the words spoken during the audio portion of the media file. The segment cropper 1350 can compare the text of one or more word segments to the keyword. If there is a match, the timing boundaries are obtained for the matching word segment, or segments in the case of a multi-word keyword (e.g. "World Baseball Classic." The timing boundaries of a word segment can include a start offset and an end offset, or duration, as previously described with respect to FIG. 2. These timing boundaries define the segment of the media content when the particular tag is spoken. For example, in FIG. 13, the first word segment containing the keyword "steroids" is word segment WS050 having timing boundaries of T30 and T31. The timing boundaries of the matching word segment(s) containing the keyword(s) are extended by comparing the timing boundaries of the matching word segment(s) to the timing boundaries of the other types of content segments (e.g., audio speech segment, video segment, marker segment as previously described in FIG. 2). If the timing boundaries of the matching word segment fall within the timing boundaries of a broader content segment, the timing boundaries for the keyword can be extended to coincide with the timing boundaries of that broader content segment.

For example, in FIG. 13, marker segments MS001 and MS002 defining timing boundaries that contain a plurality of the word segments 1610. Marker segments can be identified within a media file or stream with embedded data serving as a marker (e.g., the beginning of a chapter). Marker segments can also be identified from a content descriptor, such as a web page. For example, a web page linking to a movie may state in the text of the page, "Scene starts at time hh:mm:ss (i.e., hours, minutes, seconds)." From such information, a segment index including marker segments can be generated. In this example, marker segment MS001 defines the timing boundaries for the World Baseball Classic segment, and marker segment MS002 defines the timing boundaries for the steroids segment. The segment cropper 1350 searches for the first word segment containing the keyword tag "steroids" in the text of the timed word segments 1610, and obtains the timing boundaries for the matching word segment WS050, namely start offset T30 and end offset T31. The segment cropper 1350 then expands the timing boundaries for the keyword by comparing the timing boundaries T30 and T31 against the timing boundaries for marker segments MS001 and MS002. Since the timing boundaries of the matching word segment falls within the timing boundaries of marker segment MS002, namely start offset T2 and end offset T99, the keyword "steroids" is mapped to the timing boundaries T25 and T99. Similarly, the second and third instances of the keyword tag "steroids" in word segments WS060 and WS070 fall within the timing boundaries of marker segment MS002, and thus the timing boundaries associated with tag "steroids" do not change. Where multiple instances of the tag cannot be found in multiple non-contiguous content segments, the tag can be associated with multiple timing boundaries corresponding to each of the broader segments.

In other embodiments, the segment cropper can be omitted, and the filtered and sorted metadata documents can be transmitted from the filter and sort engine 1430 to the media merge module 1350. In such embodiments, the media merge module merges the content of the entire media file or stream into the merged content.

At step 1460, the media merge module 1360 receives the metadata that corresponds to the candidates media files or streams, including the timing information for the boundaries of the selected content segments (e.g., start offset, end offset, and/or duration) from the segment cropper 1350 (if any). The media merge module 1360 then merges one or more segments from the media search along with the predetermined media segments according to the channel format as defined by the set of rules and preferences as defined by the channel selector 1310. The media merge module 1360 operates as previously described with respect to FIGS. 9A-9B or FIGS. 10A-10B.

FIGS. 9A and 9B are diagrams illustrating a computerized method for merging content segments for playback according to the first embodiment. In this first embodiment, a playlist that identifies the content segments to be merged for playback is generated using the timing information from the metadata. The playlist identifies the selected content segments and corresponding timing information for accessing the selected content segments within each of a number of discrete media content. The plurality of discrete media content and the generated play list are downloaded to a client for playback, storage or further processing.

FIGS. 10A-10C are diagrams illustrating a computerized method for merging content segments for playback according to the second embodiment. In the second embodiment, the merged media content is generated by extracting the selected content segments from each of the underlying media files/streams using the timing information from the corresponding metadata. The extracted content segments are then merged into one or more discrete media files/streams and downloaded to a client for playback, storage or further processing. In particular embodiments, a playlist can also be generated that identifies the selected content segments and corresponding timing information for accessing the selected content segments within the merged media file(s). Using the playlist, a user can control the media player to navigate from one content segment to another as opposed to merely fast forwarding or reversing media playback in fixed time increments.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. Communication networks can also all or a portion of the PSTN, for example, a portion owned by a specific carrier.

The computing system can include clients and servers. A client and server are generally remote from each other and typically interact through a communication network. The relationship of client and server arises by virtue of computer programs running on the respective computers and having a client-server relationship to each other.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for gathering and presenting navigable search snippets, the method comprising
performing a keyword search on an enhanced metadata index;
receiving a set of discrete media files/streams satisfying the keyword search;
obtaining enhanced metadata documents for at least one of the discrete media files/streams, the enhanced metadata documents identifying one or more content segments within the media file/streams, text associated with words spoken during the one or more content segments and corresponding timing information defining the boundaries of the one or more content segments;
applying a segment type preference to the one or more content segments;
comparing the text associated with the words spoken during the one or more content segments associated with the segment type preference to the keyword search; and
if the text associated with the words spoken during the one or more content segments associated with the segment type preference contains a match to the keyword search, presenting the one or more content segments associated with the segment type preference as navigable search snippets in a search result, wherein each of the navigable search snippets include a text area displaying the text associated with the words spoken during the navigable search snippets, each of the navigable search snippets allowing for playback of the one or more content segments at a user-selected text location chosen from the text area;
allowing for playback of the navigable search snippets at a playback offset associated with a user-selected text location chosen from the text area, wherein the playback offset corresponds to a user-selected segment type, wherein the user-selected segment type is one of word segments, audio speech segments, video segments, non-speech audio segments, and marker segments.

2. The computer-implemented method of claim 1 wherein, if the text associated with the words spoken during the one or more content segments does not contain a match to the keyword search query, the one or more content segments associated with the text is discarded.

3. The computer-implemented method of claim 1 further comprising the step of:
trimming the displayed text of the navigable search snippets to fit within boundaries of the text area.

4. The computer-implemented method of claim 3 wherein the displayed text can be trimmed by locating a word matching the keyword search and limiting the number of additional words before and after the word.

5. The computer-implemented method of claim 1 wherein the enhanced metadata documents further identify one of a segment identifier, a segment type, a start offset, an end offset and a confidence score.

6. The computer-implemented method of claim 1 wherein the enhanced metadata documents includes a confidence score.

7. The computer-implemented method of claim 6 wherein, if the confidence score falls below a predetermined threshold, the one or more content segments is discarded.

8. The computer-implemented method of claim 6 wherein, if the confidence score equals or exceeds a predetermined threshold, the one or more content segments is kept.

9. The computer-implemented method of claim 1 further comprising the step of:
filtering the displayed text of individual words from the navigable search snippets according to their confidence scores.

10. The computer-implemented method of claim 1 further comprising the step of:
determining a segment type preference.

11. The computer-implemented method of claim 10 wherein the segment type preference indicates which types of content segments to search and present as snippets.

12. The computer-implemented method of claim 11 wherein the segment type preference comprises a numeric value or string corresponding to one or more of the segment types.

13. The computer-implemented method of claim 1 further comprising the step of:
ranking and sorting the search result.

14. A computerized apparatus for gathering and presenting search snippets that enable user-directed navigation comprising:
a search engine module implemented using a programmed processor, the search engine module conducts a keyword search of an index for a set of discrete media files/streams satisfying the keyword search and obtains enhanced metadata descriptive the set of discrete media files/streams, the enhanced metadata identifies one or more content segments within the media file/streams, text associated with words spoken during the one or more content segments and corresponding timing information defining the boundaries of the one or more content segments;
a snippet generator implemented using a programmed processor, the snippet generator module programmed to:
obtain the enhanced metadata for at least one of the discrete media files/streams;
apply a segment type preference to the one or more content segments;
compare the text associated with the words spoken during the one or more content segments associated with the segment type preference to the keyword search;
if the text associated with the words spoken during the one or more content segments associated with the segment type preference contains a match to the keyword search, present the one or more content segments associated with the segment type preference as navigable search snippets in a search result, each of the navigable search snippets including a text area displaying the text associated with the words spoken during the one or more content segments; and
navigation controls for allowing playback of the navigable search snippets at a playback offset associated with a user-selected text location chosen from the text area, wherein the playback offset corresponds to a user-selected segment type, wherein the user-selected segment type is one of word segments, audio speech segments, video segments, non-speech audio segments, and marker segments.

15. The computerized apparatus of claim 14 wherein, if the text associated with the words spoken during the one or more content segments does not contain a match to the keyword search query, the one or more content segments associated with the text is discarded.

16. The computerized apparatus of claim 14 further comprising the step of:
trimming the displayed text of the navigable search snippets to fit within boundaries of the text area.

17. The computerized apparatus of claim 16 wherein the displayed text can be trimmed by locating a word matching the keyword search and limiting the number of additional words before and after the word.

18. The computerized apparatus of claim 14 wherein the enhanced metadata documents further identify one of a segment identifier, a segment type, a start offset, an end offset and a confidence score.

19. The computerized apparatus of claim 14 wherein the enhanced metadata documents includes a confidence score wherein, if the confidence score falls below a predetermined threshold, the one or more content segments is discarded and wherein, if the confidence score for the equals or exceeds a predetermined threshold, the one or more content segments is kept.

20. The computerized apparatus of claim 14 further comprising the step of:
filtering the displayed text of individual words from the navigable search snippets according to their confidence scores.

* * * * *